(12) United States Patent
Yang

(10) Patent No.: US 7,388,541 B1
(45) Date of Patent: Jun. 17, 2008

(54) SELF-CALIBRATING POSITION LOCATION USING PERIODIC CODES IN BROADCAST DIGITAL TRANSMISSIONS

(76) Inventor: Chun Yang, 113 Clover Hill La., Harleysville, PA (US) 19438

( * ) Notice: Subject to any disclaimer, the term of this patent is extended or adjusted under 35 U.S.C. 154(b) by 0 days.

(21) Appl. No.: 11/604,151

(22) Filed: Nov. 27, 2006

Related U.S. Application Data

(63) Continuation-in-part of application No. 11/188,258, filed on Jul. 25, 2005.

(51) Int. Cl.
G01S 3/02 (2006.01)

(52) U.S. Cl. .................................. 342/464

(58) Field of Classification Search ............ 342/357.02, 342/357.06, 357.12, 357.15, 463–464
See application file for complete search history.

(56) References Cited

U.S. PATENT DOCUMENTS 6,114,991 A * 9/2000 Richton et al. .......... 342/357.06
6,249,245 B1 * 6/2001 Watters et al. ............ 342/357.1
6,861,984 B2 3/2005 Rabinowitz et al. ......... 342/464

OTHER PUBLICATIONS

G.M. Djuknic et al, Geolocation and Assisted-GP, White Paper, Mobility: 3G-CDMA2000 & UMTS, Lucent Technologies, Bell Labs, May 31, 2002.*

* cited by examiner

Primary Examiner—Thomas H. Tarcza
Assistant Examiner—Fred H. Mull
(74) Attorney, Agent, or Firm—LaMorte & Associates

(57) ABSTRACT

A broadcast digital transmission (BDT) receiver, computer-readable media, and associated method for receiving and processing of BDT signals from a plurality of transmitters. A BDT receiver includes an antenna to intercept broadcast radio signals and an analog front-end to down-convert it to a suitable frequency for digitization. A baseband signal processor acquires and tracks designated codes in BDT signals using a generalized correlator to produce time of arrival measurements thereof. A data processor, coupled to the baseband signal processor and with input from an auxiliary sensor and a digital database, first calibrates time offsets of said transmitters relative to the BDT receiver's time base and then operates on offset-adjusted time of arrival measurements to produce a position solution.

30 Claims, 16 Drawing Sheets

| | $T_0, X_0$ | $\Delta X_1$ Known from INS $\longrightarrow$ $T_1, X_1 = \Delta X_1 + X_0$ | ... | $\Delta X_k$ Known from INS $\longrightarrow$ $T_k, X_k = \Delta X_k + ... + \Delta X_1 + X_0$ | |
|---|---|---|---|---|---|
| Transmitter 1 | 1 Equation with 4 Unknowns | 2 Equation with 4 Unknowns | | 3 Equation with 4 Unknowns | |
| Transmitter 2 | 2 Equations with 5 Unknowns | 4 Equations with 5 Unknowns | | 6 Equations with 5 Unknowns | |
| Transmitter 3 | 3 Equations with 6 Unknowns | 6 Equations with 6 Unknowns | | 9 Equations with 6 Unknowns | |
| ... | | | | | |
| Transmitter n | n Equations with n+3 Unknowns | 2n Equations with n+3 Unknowns | | kn Equations with n+3 Unknowns | |
| | Unsolvable | Solvable When $n \geq 3$ | | Solvable When $k \geq \left\lceil \frac{n+3}{n} \right\rceil$ | |

*Fig. 12a*

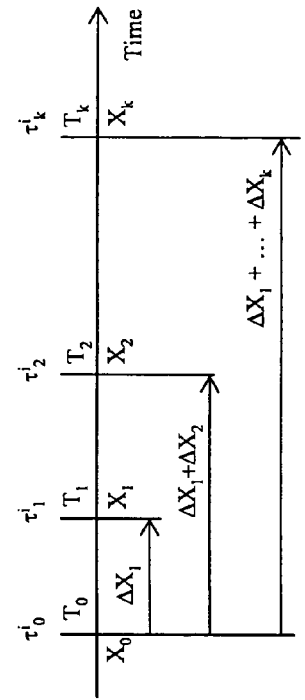

*Fig. 12c*

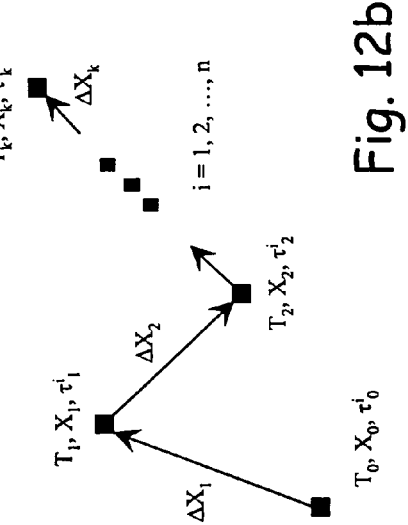

*Fig. 12b*

SELF-CALIBRATING POSITION LOCATION USING PERIODIC CODES IN BROADCAST DIGITAL TRANSMISSIONS

RELATED APPLICATIONS

This application is a continuation-in-part of co-pending patent application Ser. No. 11/188,258, entitled, Global Navigation Satellite System (GNSS) Receivers Based On Satellite Signal Channel Impulse Response, filed Jul. 25, 2005.

DOCUMENT DISCLOSURE REFERENCE

This application claims priority of Disclosure Documents No. 583,936, filed Aug. 12, 2005, entitled, Generalized Frequency-Domain Correlator (GFDC) for Global Navigation Satellite System (GNSS) Receivers and No. 603,633, filed Jul. 17, 2006, entitled, Method and Device for Self Calibrated Relative Positioning with Synchronization Signals in Digital Wireless Transmissions.

BACKGROUND OF THE INVENTION

1. Field of the Invention

The present invention relates generally to radio geolocation and particularly to self-calibrating receivers for position location using periodic codes in such broadcast digital transmissions as broadcast digital television (DTV) signals.

2. Description of the Prior Art

Among different radio geolocation and navigation systems, there are two important systems in wide use today. One is the 100 kHz Long Range Navigation-C (LORAN-C) system which evolved to the present form in the mid-1950s. It uses terrestrial radio transmitters to provide navigation, location, and timing services for suitably equipped air, land and marine users, civil and military alike. A LORAN-C receiver measures the difference in times of arrival of pulses transmitted by a chain of three to six synchronized transmitter stations separated by hundreds of kilometers. There are many LORAN chains of stations around the globe. Modernization effort is underway to enhance the accuracy, integrity, availability, and continuity of the LORAN system, known as Enhanced LORAN or eLORAN for short.

The other is the increasingly popular satellite-based Global Positioning System (GPS). Fully operational since 1994, the GPS relies upon a constellation of twenty-four satellites in six different orbital planes around the earth for position location, navigation, survey, and time transfer. Each satellite carries a set of ultra precise atomic clocks and transmits pseudo-noise code modulated signals at several frequencies. By tracking four or more satellites, a user can solve for the variables of longitude, latitude, altitude and time to precisely determine the user's location and calibrate its clock. More details are provided in the books entitled, *Global Positioning System: Theory and Applications* (Vols. I and II), edited by B. W. Parkinson and J. J. Spilker Jr., AIAA, 1996; *Understanding GPS: Principles and Applications*, edited by E. D. Kaplan, Artech House Publishers, 1996; *Fundamentals of Global Positioning System Receivers—A Software Approach*, by J. B. Y. Tsui, John Wiley & Sons, Inc., 2000; and *Global Positioning System, Signals, Measurements, and Performance*, by P. Misra and P. Enge, Ganga-Jamuna Press, 2001.

Despite of its increased popularity, GPS cannot function well when the line-of-sight view between a receiver and a GPS satellite is obstructed due to foliage, mountains, buildings, or other structures. To satisfy the requirements of location-based mobile e-commerce and emergency call location (E911), there have been ongoing efforts so as to improve GPS receiver sensitivity to operate on GPS signals of very low power level. One approach is the assisted GPS (AGPS). The AGPS approach relies upon a wireless data link to distribute, in real time, such information as time, frequency, navigation data bits, satellite ephemeredes, and approximate position as well as differential corrections to special GPS receivers equipped with a network modem so as to reduce the uncertainty search space, to help lock onto signals, and to assist navigation solution. This approach, however, comes with a heavy price associated with installing and maintaining the wireless aiding infrastructure and services.

Another approach strives for weak GPS signal acquisition without network assistance. This is done by enhancing the sensitivity of standalone GPS receivers with extended coherent integration. As an example, the block-accumulating coherent integrating correlation at extended length (BACIX) algorithm is disclosed in the patent application Ser. No. 11/173,894, filed Jul. 1, 2005, entitled, Method and Device for Acquiring Global Navigation Satellite System (GNSS) Signals of Very Low Power Level by the present inventor.

Amid the ongoing replacement of analog National Television System Committee (NTSC) television signals by an Advanced Television Systems Committee (ATSC) digital television (DTV) signal, there has been a considerable amount of efforts devoted to the use of DTV signals for position location, thus serving as a complement to and/or a substitute for GPS. This is exemplified by the U.S. Pat. No. 6,861,984, entitled, Position Location Using Broadcast Digital Television Signals, by M. Rabinowitz and J. J. Spilker Jr., issued Mar. 1, 2005.

Designed primarily for indoor reception, DTV signals exhibit several advantages. It is much higher in power (40 dB over GPS) and at lower and more diverse frequencies (nearly half of the spectrum between 30 MHz and 1 GHz). The geometry offered by a network of terrestrial DTV transmitters is superior to what a satellite constellation can provide. As such, it has better propagation characteristics with greater diffraction, larger horizon, and stronger penetration through buildings and automobiles. DTV signals have a bandwidth of 6 to 8 MHz, which is much wider than the primary lobe of GPS C/A-code (2 MHz), thereby minimizing the effects of multipath and permitting higher accuracy tracking.

With DTV transmitters fixed on the ground, their lines of sight to a user changes very slowly, only adding a small amount of Doppler shift to a DTV signal frequency. This allows the signal to be integrated over a long period of time, thus easing the task of acquisition and tracking of a weak signal considerably. As a further benefit, the component of a DTV signal that can be used for timing is of low duty factor (e.g., 1 of 313) in contract to GPS wherein the ranging code is repeatedly transmitted and has to be tracked continuously.

However, one inherent technical difficulty faced by position location using broadcast digital transmissions (BDT) such as DTV signals is the clock bias and drift of the signal timing source at a transmitter, which are unknown to a user initially. Although it may be possible to have all DTV stations use ultra-precise atomic clocks or GPS disciplined clocks, the synchronization of all signal transmissions across a large region is a daily operational challenge. It may also be possible to time-tag all transmissions and embed the clock offset information in the broadcast signals for all stations in a given region. However, these approaches require coordinated involvement of local DTV operators who are not in time transfer but rather broadcasting business.

Many inventions exemplified by the U.S. Pat. No. 6,861, 984 by M. Rabinowitz and J. J. Spilker Jr. mentioned earlier make use of base stations, location servers, and monitor units to calibrate the DTV transmitters' timing biases and to provide the calibration data to mobile users via dedicated data links. The double difference technique may also be employed in these systems for positioning. There is a significant cost associated with installing and maintaining the infrastructure of base stations, location servers, and monitor units on a large scale. A user has to subscribe to a service coverage in addition to special equipment for the service signals.

Clearly, a user risks to experiencing service discontinuity when moving from one region (or a country for the matter) to another without a global service network in place or a valid global subscription. These prior-art approaches further prevent broadcast digital transmission (BDT) signals from being used for military applications as signals of opportunity (SOOP). A need therefore exists for a self calibrating position location system using broadcast digital transmissions such as DTV signals that does no require the service from external base stations, location servers, and monitor units. This need is met by the present invention as described and claimed below.

SUMMARY OF THE INVENTION

The present invention is a broadcast digital transmission (BDT) receiver, a computer program product tangibly stored in computer-readable media, and associated method for receiving and processing of special codes embedded in BDT signals from a plurality of transmitters to produce time of arrival (TOA) measurements thereof, leading to a position solution.

A BDT receiver includes an antenna and an analog front-end to intercept the incoming radio-frequency (RF) signal and to convert it to an appropriate intermediate frequency (IF) for digitization. A baseband signal processor is organized into functionally identical channels, each dynamically assigned to a different transmitter. Special periodic codes of BDT transmissions such as those for synchronization are typically of low duty factor; as such search thereof is conducted in the baseband signal processor over small overlapping data windows covering the entire code repetition interval. Once acquired, a signal is tracked in a closed loop fashion wherein update is windowed in sync with the low duty cycle so as to save precious resources. In both acquisition and tracking, the baseband signal processor performs a generalized correlation between the incoming signal samples and a reference code over a number of code lags and for a number of Doppler frequency bins. This results in a two-dimensional delay-Doppler map of complex generalized correlations from which the baseband signal processor further extracts the code delay and carrier phase and frequency parameters to close a joint code and carrier tracking loop and measures time of arrival (TOA) of the special codes relative to the data window.

An online/onboard database is available to supply a location of a plurality of transmitters and other pertinent information upon demand. Auxiliary sensors are also available to provide necessary information so that a position location data processor, coupled to the baseband signal processor and the online/onboard database, initially applies a self-calibration procedure to determine time offset of a plurality of transmitters relative to BDT receiver's local time base. The data processor then operates on time of arrival measurements of a plurality of transmitters to produce a position solution for the BDT receiver by a least-squares estimator or a Kalman filter.

Particular embodiments can include one or more of the following features. The broadcast digital transmission (BDT) is a broadcast digital television (DTV) signal and the broadcast digital television signal is an Advanced Television Systems Committee (ATSC) digital television signal. The special periodic code is a field synchronization segment with an ATSC/DTV data frame, a segment synchronization sequence within a data segment within an ATSC/DTV data frame, or a combination thereof. The database uses a cell phone, the Internet, or other means to gain online access for latest update. The auxiliary sensors include a GPS receiver, an interface for a user to input information, and wheel speed sensors (WSS) for automotive users among others. Time offset calibration uses a point calibration technique, a displacement calibration technique, or a combination thereof. In one embodiment, when GPS signal is available, the GPS receiver is used to calibrate the BDT receiver and to obtain a joint position and calibration solution; when GPS signal is weak, the BDT receiver is used to assist GPS to maintain its lock onto signals; and when GPS is not available, the BDT receiver can continue to operate, thus ensuring the continuity of user's position solution.

In addition, an ATSC DTV signal may also contain a pseudorandom sequence as an "RF watermark" that is uniquely assigned to each DTV transmitter for transmitter identification (TxID) in system monitoring and measurement. As described in *Synchronization Standard for Distributed Transmission, Document A/110A*, Jul. 19, 2005, a Kasami sequence with a period of $2^{16}-1$, which repeats nearly four times per complete data field (approximately 6.05 milliseconds), is injected, which is at least 30 dB below the primary DTV signal. A method for using this pseudorandom sequence for position location was disclosed in the paper entitled, "A New Position Location System Using DTV Transmitter Identification Watermark Signals," by Wang, Wu, and Chouinard in *EURASIP Journal on Applied Signal Processing*, Article ID 42737, 2006. Similarly, in the U.S. Pat. No. 6,914,560, entitled, Position Location Using Broadcast Television Signals Comprising Pseudonoise Sequences, by J. J. Spilker, Jr. and J. K. Omura, issued Jul. 5, 2005, the injection of such pseudonoise codes as the new GPS L5 codes was proposed. As it will be made evident in this specification, the invention method is equally well applicable to these pseudonoise RF watermark codes.

When a BDT receiver is implemented as a software receiver, any change in broadcast signal characteristics can be easily accommodated by simple reprogramming the receiver when moving from one region or one country to another. In an urban environment, the direct signal from a transmitter may be attenuated whereas the multipath signals reflected from surroundings, although arriving later in time, may appear stronger. Conventional delay-lock loop (DLL) is known to develop large errors in the presence of multipath. The generalized frequency-domain correlator (GFDC) used in the present invention, on the other hand, produces a major portion of the correlation function (or the entire function if desired) from which the direct signal and multipath fingerprint can be isolated. And more importantly, the generalized correlation peak is much sharper, thus being less susceptible to multipath and leading to better timing and ultimately to better position location.

BRIEF DESCRIPTION OF THE DRAWINGS

For a better understanding of the present invention, reference is made to the following description of an exemplary embodiment thereof, considered in conjunction with the accompanying drawings wherein:

FIGS. 12a, 12b, and 12c are drawings illustrating the problem solvability in terms of number of equations available per observation vs. number of observations (transmitters) vs. number of unknowns to solve over time (FIG. 12a), the geometry for a sequence of vector displacements (FIG. 12b), and the corresponding timeline for the same displacement sequence (FIG. 12c);

Figure 1:
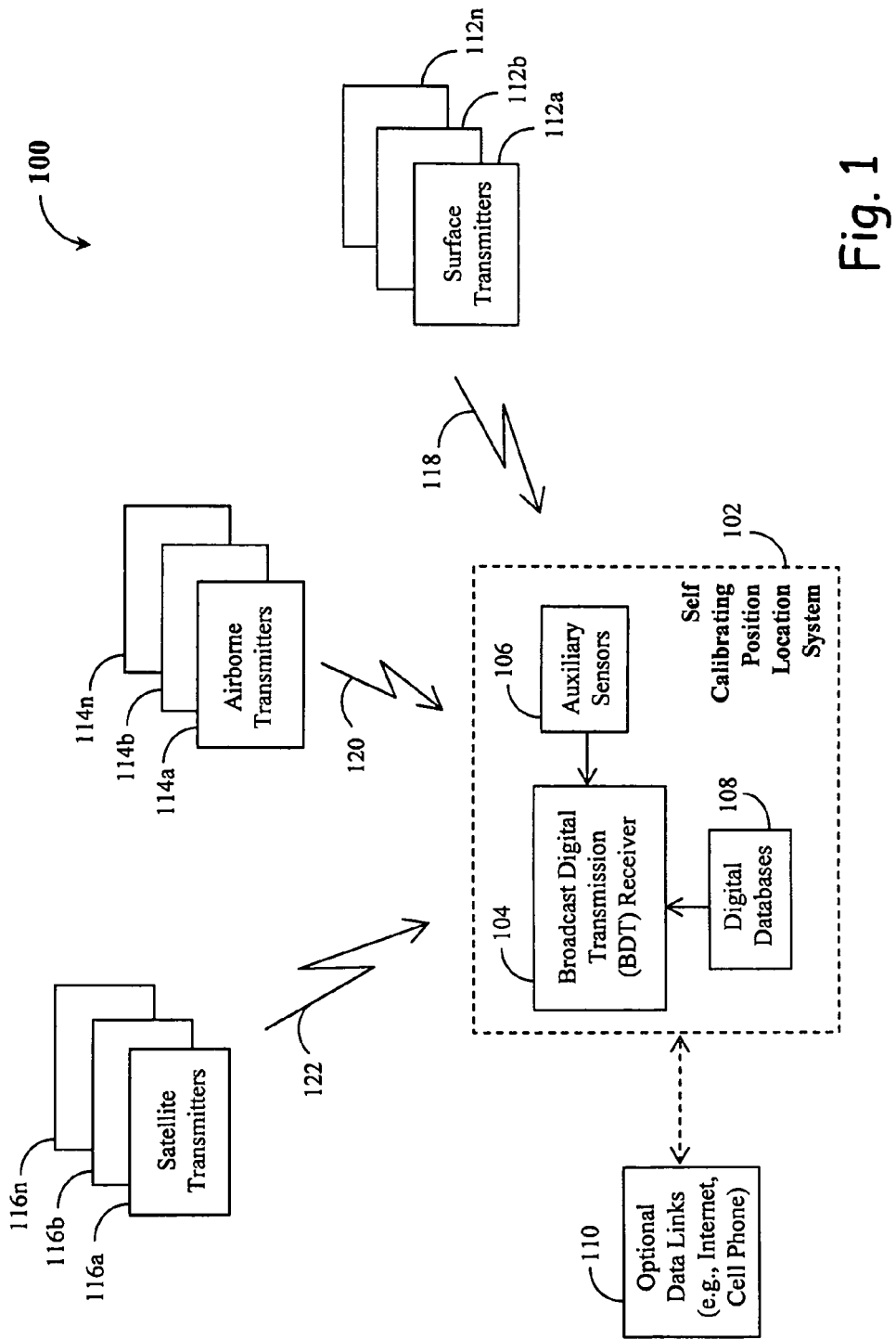
FIG. 1 is a schematic drawing illustrating an exemplary embodiment of the present invention including a self-calibrating position location system that receives broadcast digital transmissions (BDT) from a plurality of transmitters and interfaces with optional data links.

The leading digit(s) of each reference numeral used in this specification indicates the number of the drawing in which the reference numeral first appears.

DETAILED DESCRIPTION OF THE INVENTION

The present invention can be used for position location with all broadcast digital transmissions from transmitters at known locations that employ repetitive codes for synchronization and are particularly well suited for digital television (DTV) signals. Accordingly, an exemplary embodiment of the present invention will be described in an application to the Advanced Television Systems Committee (ATSC) DTV signals in the United States for self-calibrating position location and navigation.

The techniques disclosed herein are applicable to DTV signals as defined by the European Digital Video Broadcasting (DVB) standards, the Japanese Integrated Service Digital Broadcasting-Terrestrial (ISDB-T) standards, the South Korean Terrestrial-Digital Multimedia Broadcasting (T-DMB) standards, and Chinese Digital Multimedia Broadcast-Terrestrial/Handheld (DMB-T/H) standards among others.

Referring to FIG. 1, an exemplary embodiment 100 of the present invention is sketched wherein a self-calibrating position location system 102 receives broadcast digital transmissions (BDT) 118, 120, and 122 from a plurality of transmitters. This includes surface transmitters 112a and 112b through 112n at known locations on the ground for instances. It may also include airborne transmitters 114a and 114b through 114n with their locations either embedded in digital transmissions or made available to a BDT receiver 104 by other means. Satellite transmitters 116a and 116b through 116n can be used in a similar manner. In a sense, GPS satellites fall into this category because a GPS satellite broadcasts its orbit and clock information within navigation messages modulated on the radio signal. More generally, surface transmitters do not need to be fixed on the ground for use in the present invention so long as their locations at time of broadcasting are precisely known to a BDT receiver 104 at reception.

Still referring to FIG. 1, a self-calibrating position location system 102 includes a BDT receiver 104, auxiliary sensors 106, and digital databases 108 as well as optional data links 110. More details about a BDT receiver 104 will be provided later on in this specification. By auxiliary sensors, we mean those sensors that are co-located with a BDT receiver 104 and can provide necessary information for calibration. This may include a GPS receiver and wheel speed sensors (WSS) when an automobile is a user, which will be further described in this specification later on. Digital databases 108 contain such information as locations of ground transmitters and their spectrum band allocation (also referred to as a channel) as well as digital road maps and local terrain elevation information. The optional data links may include such popular devices as the Internet and a cell phone for online access to road maps and local weather information for instance.

Figure 2:
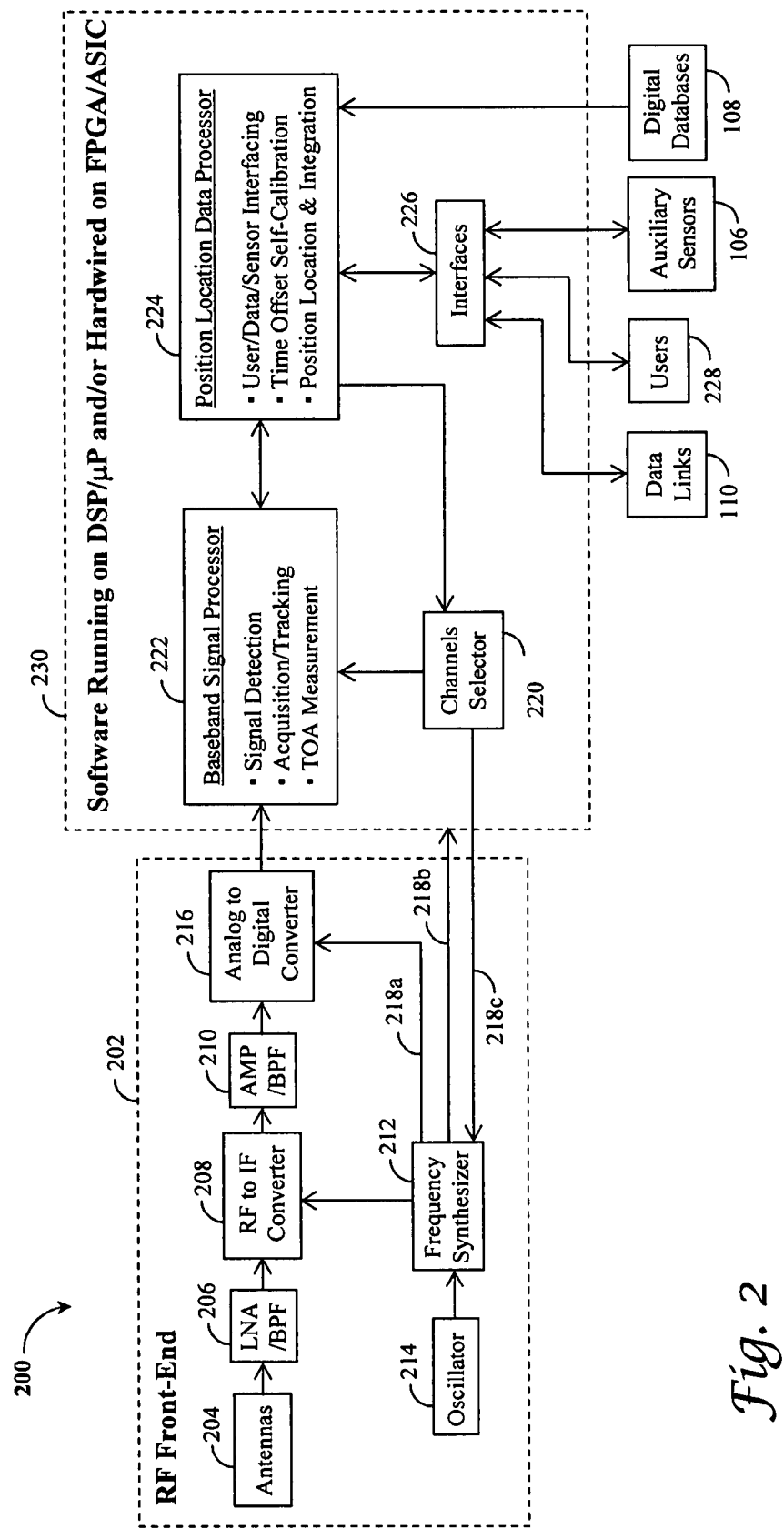
FIG. 2 is a schematic illustrating the overall architecture of an exemplary embodiment of a self-calibrating position location BDT receiver in accordance with the present invention.

Referring to FIG. 2, an exemplary embodiment 200 of a broadcast digital transmission (BDT) receiver 104 is depicted with a radio frequency (RF) front-end 202 coupled to a receiver software 230 either running on a digital signal processor (DSP)/a microprocessor (μP) or hardwired on a field programmable gate array (FPGA)/an application-specific integrated circuit (ASIC) chip in accordance with the present invention. More specifically, antennas 204 intercept RF signals that come from a plurality of transmitters on the ground 112, in the air 114, and/or from the space 116. Captured signals are low-noise amplified (LNA) and bandpass-filtered (BPF) 206 and coupled to a RF to IF converter 208 with mixers. There may be several RF to IF conversion stages, each followed by an amplifier (AMP)/a bandpass filter (BPF) 210 in order to reach the desired gain and bandwidth while minimizing unwanted nonlinearity and interference effects. To drive a RF front-end 202, various frequency components are produced by a frequency synthesizer 212 driven in turn by, say, a temperature-compensated crystal oscillator (TCXO) 214. The frequency synthesizer 212 also produces a sampling clock 218a to an analog to digital converter (ADC) 216 that samples and quantizes the IF signal and then passes the samples over for digital processing. The sampling rate should be sufficiently high to obtain an accurate representation of the BDT signal, as would be apparent to one skilled in the art. The frequency synthesizer 212 may also provide a clock 218b to drive digital signal processing that follows. The frequency synthesizer 212 may be tuned via an instruction line 218c to a desired center frequency of a particular broadcast digital transmission by a channels selector 220.

Still referring to FIG. 2, the incoming signal samples provided by an analog to digital converter 216 are first processed in a baseband signal processor 222 wherein the signals from transmitters chosen by the channels selector 220 are detected, acquired and tracked to produce time of arrival (TOA) measurements. The TOA measurements are then passed on to a position location data processor 224. Due to low duty factor, a baseband signal processor 222 operates on windowed data, thus easing throughput demand and saving power consumption. Details of the operations of a baseband signal processor 222 will be presented when describing subsequent figures.

Referring again to FIG. 2, as a part of the receiver software running on a DSP/μP/FPGA/ASIC, interfaces 226 are used to display the results to and receive commands from users 228 in addition to interactions with auxiliary sensors 106 and data links 110. Together with digital databases 108, they provide necessary measurements and prior knowledge to facilitate the receiver 230 to carry out self calibration and position location. These operations are executed by a position location data processor 224, the details of which will be presented later on when describing the associated figures. The techniques for design and construction of antennas, RF front-end, data link modems, user interfaces, digital databases, and auxiliary sensors that possess the characteristics relevant to the present invention are well known to those of ordinary skill in the art.

As stated earlier, although the present invention is applicable to many broadcast digital transmissions, a preferred embodiment is described in this specification for the ATSC DTV signal. The current ATSC DTV signal is described in *ATSC Digital Television Standard (A/53), Revision E, with Amendment No.* 1, Dec. 27, 2005 with Amendment No. 1 dated Apr. 18, 2006, which is graphically illustrated in FIG. 3a for the frame structure, in FIG. 3b for a field sync segment, and in FIG. 3c for a data segment, respectively.

Figure 3:
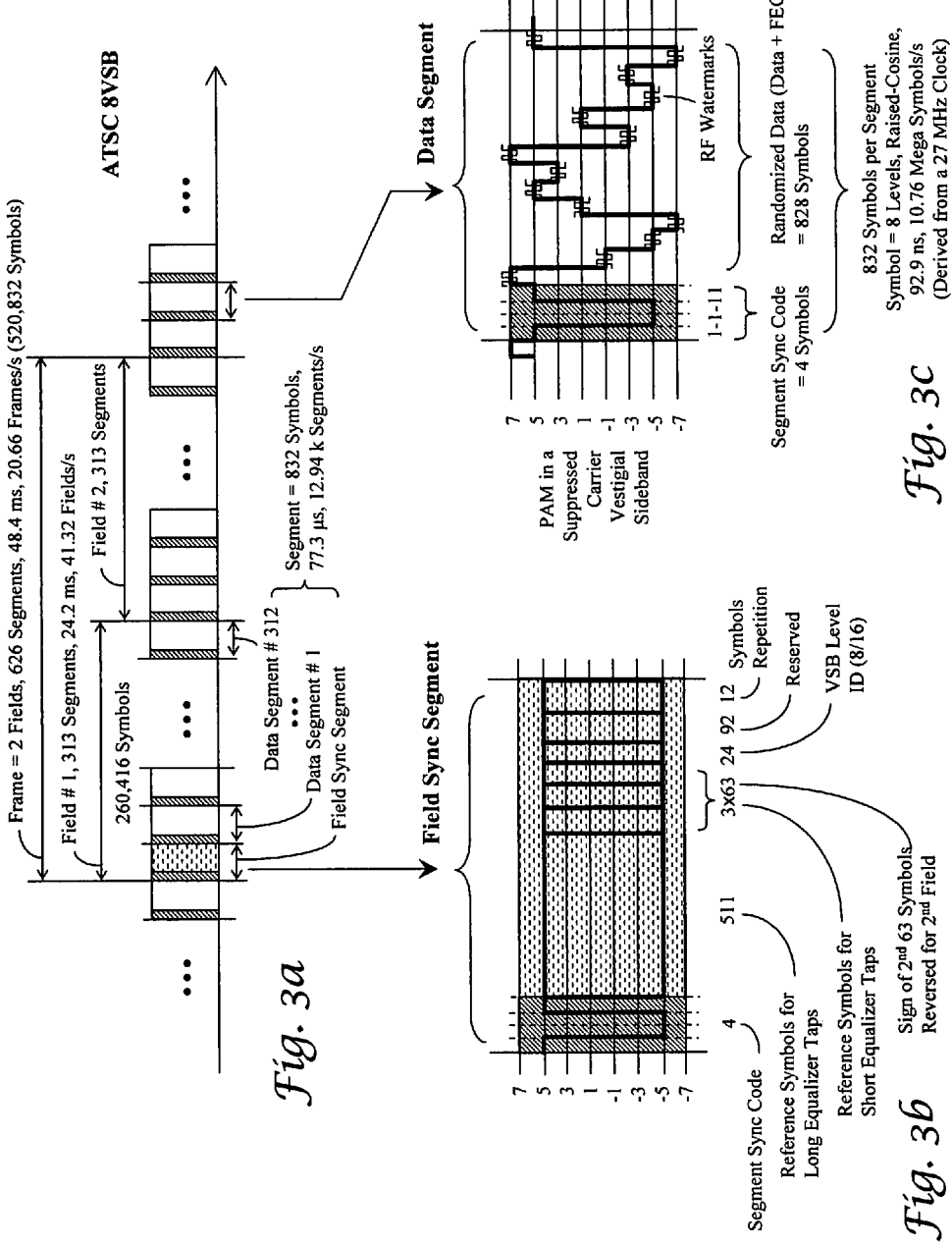
FIGS. 3a, 3b, and 3c are drawings illustrating the structure of an ATSC DTV frame (FIG. 3a), the structure of a field synchronization segment within an ATSC DTV frame (FIG. 3b), and the structure of a data segment within an ATSC DTV frame (FIG. 3c)

As shown in FIG. 3a, the ATSC DTV signal uses the 8-ary Vestigial Sideband (8VSB) modulation and is organized into frames. Each frame has two fields, each field has 313 segments, and each segment has 832 symbols. The symbol rate is 10.762237 Mega-samples per second (Msps) and a symbol duration is 92.92 nanoseconds (ns), which is derived from a 27.000000 MHz clock. The segment rate is 12.935482 kilo-segments per second (ksps) and a segment duration is 77.307348 microseconds (μs). The field rate is 41.327096 fields per second and a field duration is 24.197200 milliseconds (ms). The frame rate is 20.663548 frames per second and the frame duration is 48.394400 ms). There are a total of 260,416 symbols in a field and 520,832 symbols in a frame. There are two types of segments, namely, field synchronization segment (illustrated in FIG. 3b) and data segment (illustrated in FIG. 3c). Each segment starts with 4 symbols that are used for segment synchronization purpose (thus called the segment sync code). There are two field synchronization segments in each frame, one for each field. Following each field synchronization segment are 312 data segments.

The structure of a field synchronization segment is illustrated in FIG. 3b. The two field synchronization segments in a frame differ only to the extent that the middle set of 63 symbols are inverted in the second field synchronization segment.

The structure of a data segment is illustrated in FIG. 3c. The first 4 symbols of a data segment are 1, −1, −1, 1, which are known as segment sync code and used for segment synchronization. The other 828 symbols in a data segment are information-carrying that are randomized to be different from the segment sync code. Since the modulation is 8VSB, each symbol carries 3 bits of coded data using a rate ⅔ coding scheme. The 8VSB symbol values are −7 (000), −5 (001), −3 (010), −1 (011), 1 (100), 3 (101), 5 (110), 7 (111) before pilot insertion. A pilot is a carrier signal, which has −11.5 dB less power than the data signal, and is used to aid coherent demodulation of the ATSC DTV signal. The symbol pulse has a raised-cosine waveform, which is constructed by filtering, as described in the book entitled, *Digital Communications* ($3^{rd}$ Ed.), by J. G. Proakis, McGraw-Hill, 1995.

Figure 4:
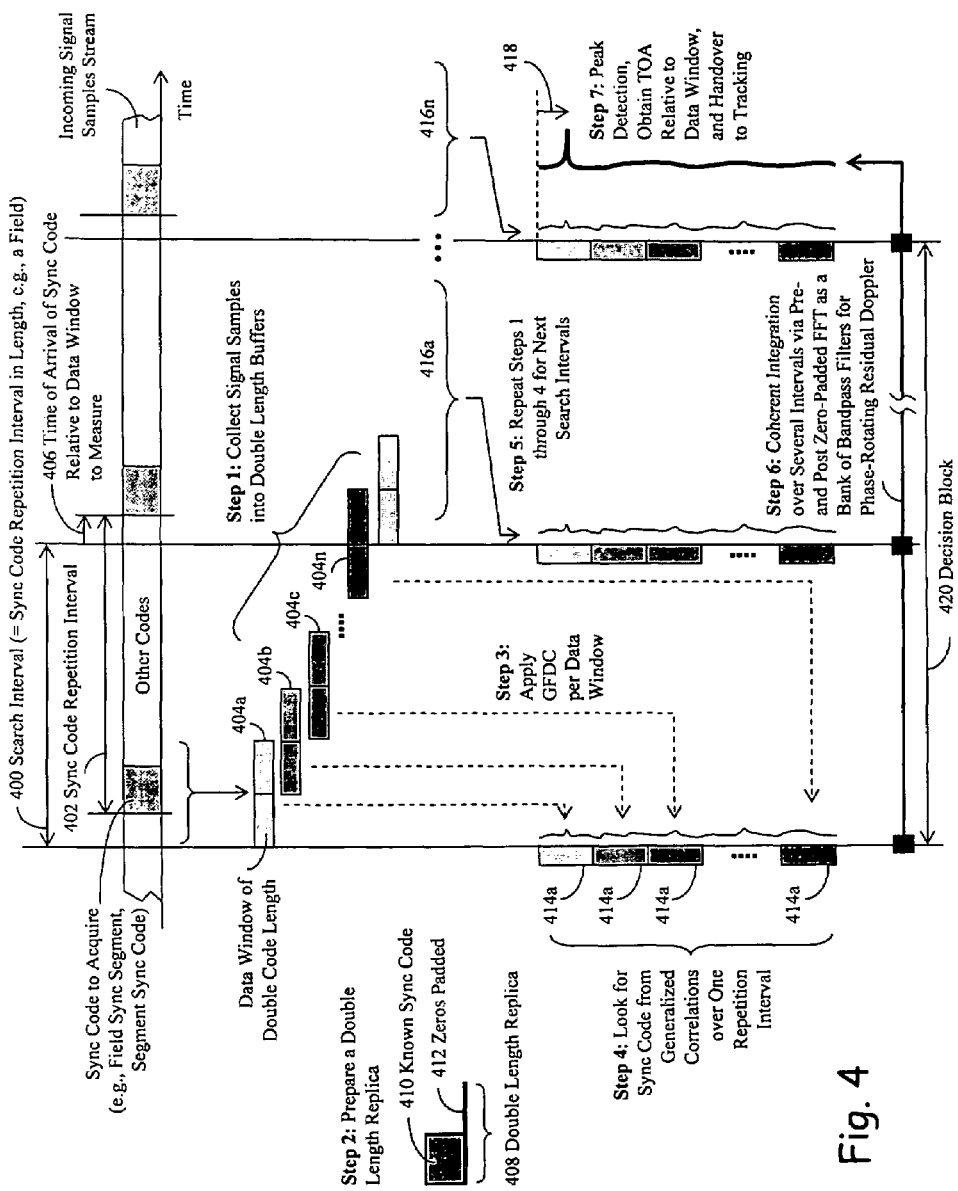
FIG. 4 is a drawing graphically illustrating method steps to for search a code sequence of low duty factor embedded in a broadcast digital transmission over a long code repetition interval using overlapping data windows and to coherently integrate correlations over several repetition intervals in accordance with the present invention.

Referring to FIG. 4, major method steps to search and detect a code sequence embedded in a broadcast digital transmission are graphically illustrated, which constitutes one of the most important tasks of a baseband signal processor 222 in accordance with the present invention. The code sequence used as an event to be acquired and time-tagged can be any known digital sequence in the received signal. However, it is preferred to be repetitive with a reasonable periodicity. In a preferred embodiment with ATSC DTV signals, such DTV signal components as pilot, symbol clock, or even carrier could be used for timing and ranging purposes. However, the use of such signal components would produce inherent ambiguities due to their high repetition rate (or equivalently short wavelength). There are well-known techniques in the art to resolve such ambiguities but their use would entail additional complexity to deal with. A preferred code is therefore a repetitive synchronization code in an ATSC frame such as a field synchronization segment within an ASTC DTV frame or a segment synchronization symbol sequence within a data segment within an ATSC DTV frame or a combination of both. Pseudorandom DTV transmitter identification (TxID) watermark signals can also be used to serve the same purpose.

However, the use of multiple wavelengths may be desired with the timing of field, segment, symbol, and pilot/carrier in the order from the coarsest wavelength to finest wavelength. Although it may take an extended period of time, it enables self-positioning via discrete search of integer cycle ambiguities.

Still referring to FIG. 4, since the sync code is repetitive but of low duty cycle (in contrast to GPS C/A-code that repeats itself continuously), it has to be searched for over a search interval 400 that spans the same time interval as the sync code repetition interval 402. A search interval 400 is divided into overlapping data windows 404a, 404b, and 404c through 404n. A data window is twice as long as the sync code (i.e., a double code length) when the overlap and discard algorithm is used for correlation. Time of arrival of a sync code 406 is measured relative to a data window, which is accomplished by searching and locating correlation peak. More specifically, incoming signal samples are collected into double length buffers shown as Step 1 in FIG. 4. Step 2 prepares a double length code replica 408 by appending the known sync code 410 with the same amount of zeros 412. In Step 3, correlation between signal samples over data windows 404a, 404b, and 404c through 404n and the double length replica 408 is performed. The correlation values over the first half of search space are retained while the second half is discarded, with the corresponding correlations 414a, 414b, 414c through 414n arranged over the entire search interval (equal in length to a repetition interval). A preferred method for correlation used in Step 3 is a generalized frequency-domain correlation (GFDC), which will be described more in this specification later on. Instead of the overlap and discard algorithm used above, the overlap and sum algorithm can also be used. The details of these algorithms are disclosed in the paper entitled "FFT Acquisition of Periodic, Aperiodic, Puncture, and Overlaid Code Sequences in GPS," presented by the present inventor at the 14$^{th}$ International Technical Meeting of the Satellite Division of the Institute of Navigation in September 2001 in Salt Lake City, Utah, which is incorporated into this specification by reference. To calculate a Fourier transform for a long code sequence such as a pseudonoise watermark imposed onto a DTV signal, a cascaded matrix DFT technique can be used wherein a polyphase filter is applied to an input signal sample stream, resulting in a matrix of samples, a first matrix DFT is then applied, the resulting first transform matrix is next corner-turned with "twiddle factors" applied, it is followed by a second matrix DFT, finally the second matrix transform is reordered back into an output transform stream. A similar technique was disclosed in a paper entitled "A Wide-Band High-Resolution Spectrum Analyzer," by M. P. Quirk, M. F. Garyantes, H. C. Wilck, and M. J. Grimm, in *IEEE Trans. Acoustic, Speech, and Signal Proc.*, 36(12), December 1988.

Referring to FIG. 4, Step 4 searches over the entire search interval for a correlation peak and the presence of a sync code is detected when the peak exceeds a predefined threshold. If not, Step 5 is executed to repeat Step 1 through Step 4 over next search intervals 416a in an incremental manner up to 416n (the maximum data intervals allowed to integrate).

Step 6 performs integration of correlations over several search intervals. In one embodiment, incoherent integration via power combination can be applied as the simplest method. In another embodiment, the correlations of several search intervals over a decision block 420 are first accumulated and then coherently integrated with the Fast Fourier Transform (FFT) as a bank of bandpass filters. This is equivalent to performing phase rotation (complex exponential multiplication) on the complex correlation values over time to remove residual Doppler effects. In a preferred embodiment, the correlations over successive search intervals are integrated coherently as they arrive in time so as to strength the signal while averaging out the noise in accordance with the present invention. This is done by pre- and post-padding zeros to each correlation value of a search interval to preserve its order in time order of this search interval relative to other search intervals within the decision block prior to applying FFT to the zero-padded correlation sequences. The results are added, on a frequency-to-bin basis, onto the previous results, thus forming partial sums up to this point. Those partial sums that have small accumulated values can be excluded from further consideration (pruned) to save computation and memory. Decision can be made on the partial sums to detect the underlying sync code before reaching the end of a decision block, thus reducing latency. A similar technique is the block-accumulating coherent integrating correlation at extended length (BACIX) algorithm disclosed by the present inventor in the patent application Ser. No. 11/173,894, filed Jul. 1, 2005, entitled, Method and Device for Acquiring Global Navigation Satellite System (GNSS) Signals of Very Low Power Level, which is hereby incorporated into this specification by reference.

Finally in Step 7, a final decision is made as to the presence or absence of a sync code in the signal. If yes, the time of arrival 406 (or equivalently 418) is measured relative to the data window boundary. Acquisition is then successfully terminated and the operation is handed over to tracking. If no, the process is repeated for another sync code.

Figure 5:
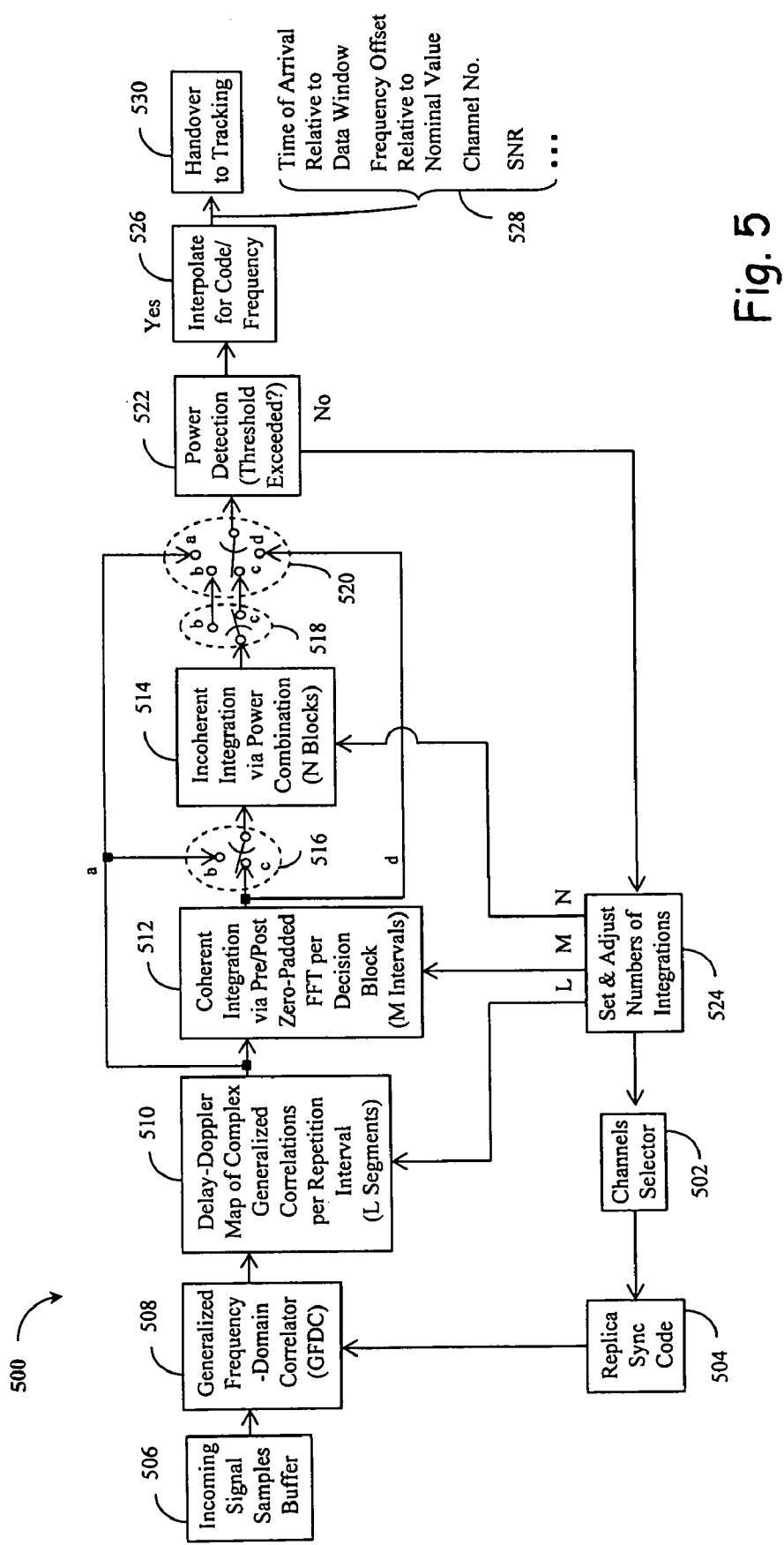
FIG. 5 is a schematic illustrating an exemplary embodiment of method steps to acquire a low duty factor code of a broadcast digital transmission using a generalized frequency-domain correlator (GFDC) followed by coherent and incoherent integrations in accordance with the present invention.

Referring to FIG. 5, the method steps of acquiring a low duty cycle repetitive sync code graphically illustrated in FIG. 4 are summarized in a block diagram 500 in accordance with the present invention. From a channels selector 502, a replica sync code 504 is prepared, be it a field sync segment or a segment sync code within an ATSC DTV frame. In a preferred embodiment, a generalized frequency-domain correlator (GFDC) 508 is used to search for a replica sync code 504 out of an incoming signal samples buffer 506. As explained in FIG. 4, the generalized correlation is carried out per data window. A data window may include a single segment or several segments within an ATSC DTV frame. The latter is beneficial when a segment sync code (a short 4 symbol sequence) is used for detection. The results of GFDC 508 over L segments (L≧1) are arranged into a delay-Doppler map of complex generalized correlations per repetition interval 510.

Still referring to FIG. 5, four options are at disposition to connect coherent integration via a pre- and post-zero-padded FFT per decision block 512 with incoherent integration via power combination 514. This is to maximize the probability of detection (raising the receiver sensitivity) while keeping operational flexibility (saving computation and memory). The configuration is done by programming switch 516, switch 518, and switch 520 into one of four possible positions a, b, c, and d, respectively. Power detection 522 is applied to determine if the signal strength exceeds a predefined threshold. If no, the integration goes on through L segments, M intervals, and N blocks. This is to set (at initialization) and adjust (in runtime) numbers of integrations 524. If yes, the signal is detected and the detected signal parameters in a list 528 can be obtained via interpolation 526, which are ready for handover to tracking 530.

In an alternative embodiment wherein a user receiver is subject to a minimal carrier frequency offset from the nominal value, a pre-correlation coherent integration can be used, instead of the afore-described post-correlation coherent integration, so as to save computations. This minimal frequency offset is impacted by small line of sight motion and small clock drift or it is compensated for by certain means. In a pre-correlation coherent integration, samples of several search intervals (each of the same length as a code repetition interval) within a decision block are added up on a sample-to-sample basis. Since the periodic code samples are aligned, they add up constructively whereas other samples pertaining to randomized data tend to cancel out, thus improving the overall signal to noise ratio (SNR). This is similar to the extended replica folding for acquisition search technique (XFAST) disclosed in a paper entitled, "Fast Direct Acquisition of P(Y)-Code Acquisition Using XFAST," presented by the present inventor at the 12$^{nd}$ International Technical Meeting of the Satellite Division of the Institute of Navigation in September 1999 in Nashville, Tenn., which is incorporated into this specification by reference.

Figure 6:
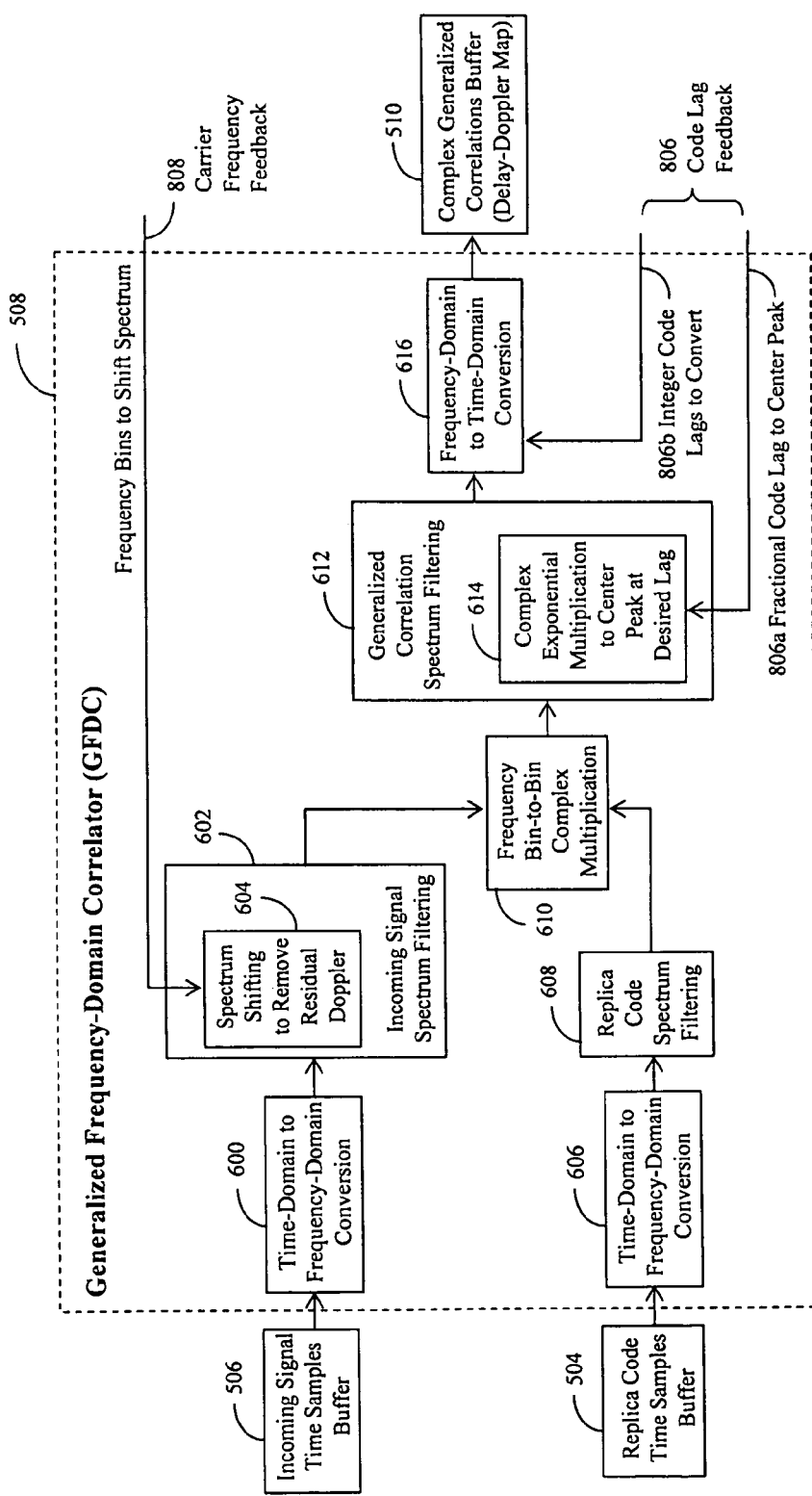
FIG. 6 is a schematic illustrating an exemplary embodiment of a generalized frequency-domain correlator (GFDC) with code and carrier feedbacks in accordance with the present invention.

Referring to FIG. 6, the generalized frequency-domain correlation processor 508 is described for the present invention as an adaptation of the co-pending patent application Ser. No. 11/188,258, entitled, Global Navigation Satellite System (GNSS) Receivers Based On Satellite Signal Channel Impulse Response, by the present inventor, filed Jul. 25, 2005, of which this specification is a continuation in part. As shown, time samples of the incoming signal are stored in an incoming signal time samples buffer 506. Signal samples undergo a time-domain to frequency-domain conversion 600, producing incoming signal spectrum samples, to which a incoming signal spectrum filtering 602 is applied. In the meantime, time samples of the replica code stored in a replica code time samples buffer 504 undergo a time-domain to frequency-domain conversion 606 of its own, producing replica code spectrum samples, to which a replica code spectrum filtering 608 is applied. The filtered spectrum samples of the incoming signal and of the replica code are used together for frequency bin to bin complex multiplication 610. Their products are the spectrum samples of the generalized correlation, to which the generalized correlation spectrum filtering 612 is applied. The filtered generalized correlation spectrum samples undergo a frequency-domain to time-domain conversion 616, yielding the time samples of generalized correlation stored in a complex generalized correlations buffer (also called a delay-Doppler map of complex generalized correlations) 510.

Domain conversions from the time domain to the frequency domain and vice versa as in blocks 600, 606, and 616 are critical computational steps, which can be realized by analog or digital means. Preferred digital means in this specification include discrete Fourier transform (DFT) and one of its efficient versions such as Fast Fourier transform (FFT), either hardwired in an FPGA or computed with software in a processor.

Referring again to FIG. 6, the size of time samples buffers 504 and 506 are selected to be twice that of a sync code interval (also referred to as a double-length buffer). For an incoming signal time samples buffer 506, one half of the buffer is replaced by new samples every correlation interval. For a replica code time samples buffer 504, one half of the buffer is padded with zeros so as to be of the same double length. As an advantage, the use of double-length buffers and replica zero-padding provides a refined frequency bin (resolution), beneficial for to spectrum shifting to remove residual Doppler 604 to be discussed later. Basically, when there is a frequency error of $\Delta f$ between an incoming signal and a reference carrier, the correlation over an interval $T_i$ suffers from a loss of $\sin(\pi \Delta f T_i)/\pi \Delta f T_i$. It is customary to tolerate a power loss of 0.9 dB or less if $\Delta f < \frac{1}{4} T_i$. The frequency resolution produced by a double length buffer is $\frac{1}{2} T_i$, which, when used as the frequency search bin, satisfies the above maximum tolerable frequency error criterion.

In addition to complex conjugation, replica code spectrum filtering 608 may include spectrum segmentation and nonlinear spectrum filtering. In addition to spectrum shifting to remove residual Doppler 604, incoming signal spectrum filtering 602 may also include spectrum segmentation and nonlinear spectrum filtering. By manipulating index (memory location) of the full spectrum, segmentation applies ideal bandpass filtering so as to select a portion of the spectrum content pertaining to a particular code of interest. Techniques for spectrum segmentation are disclosed in the patent application Ser. No. 11/188,258, filed Jul. 25, 2005, entitled, Global Navigation Satellite System (GNSS) Receivers Based on Satellite Signal Channel Impulse Response, by the present inventor, which is hereby incorporated into this specification by reference.

Referring back to FIG. 6, spectrum shifting to remove residual Doppler 604 in the frequency domain is equivalent to multiplication with a complex exponential in the time domain. This in fact performs phase-rotation of the incoming signals that removes phase changes caused by a residual Doppler frequency shift in the signal. Since the spectrum shifting only involves memory address manipulation, it is computationally advantageous than conventional sequential complex multiplication. In acquisition, the spectrum is circularly shifted up and down over the frequency bins that span the entire frequency uncertainty zone due to unknown Doppler and clock drift as prescribed by frequency bins to shift spectrum from carrier frequency feedback 808. In tracking, however, it suffices to perform as few as two shifts to the two neighboring frequency bins that saddle the estimated frequency. The spectrum may be interpolated prior to a shift by a fractional of a frequency bin. More details will be given later when describing FIG. 8.

Still referring to FIG. 6, in addition to complex exponential multiplication to center peak at desired lag 614, generalized correlation spectrum filtering 612 may include spectrum weighting with a windowing function. This is to enhance the signal to noise ratio (SNR) for reliable signal detection in the acquisition mode with a broader correlation peak and a lower noise floor. In the tracking mode, however, code lag feedback 806 is used to place a sampling point on the generalized correlation peak. This is done by first adjusting the generalized correlation spectrum with spectrum phase shift (complex exponential multiplication 614) according to a fractional code lag feedback 806a and then performing the frequency-domain to time-domain conversion 616 at as few as three data points around the correlation peak given by an integer code lag feedback 806b. The details of this technique for a conventional correlation function are disclosed by the present inventor in the U.S. Pat. No. 6,407,699 entitled, Method and Device for Rapidly Extracting Time and Frequency Parameters from High Dynamic Direct Sequence Spread Spectrum Radio Signals under Interference, issued Jun. 18, 2002, which is readily adapted for the generalized correlation with broadcast digital transmissions of the present invention and is therefore incorporated into this specification by reference. In a multipath-rich environment, correlation can be evaluated at a large number of code lags, even the entire correlation function if desired with the invention method in contrast to only at early and late lags in conventional approaches. As such strong multipath can be mitigated by selecting the earliest correlation peak.

For each incoming signal spectrum shift, a generalized correlation function is evaluated at discrete lags with the lag spacing being equal to the sampling interval. Repeated for all shifts, it produces a two-dimensional array of generalized correlation samples, one dimension for spectrum shift (Doppler estimate) and the other for code lag (delay estimate) stored in the delay-Doppler map of complex generalized correlations 510.

The spectra of the incoming signal, replica code, and generalized correlation can be filtered separately or jointly. An exemplary nonlinear spectrum filtering is to scale a spectrum by the magnitude of itself or another spectrum. This normalization is equivalent to whitening (flattening) the spectrum, producing a much sharp waveform in the time domain. In order words, it removes the magnitude information from the spectrum and retains only the phase information. When the incoming signal spectrum is normalized by the replica code spectrum, it produces a signal channel transfer function and its inversion to the time domain gives a signal channel impulse response. The use of an impulse response as a generalized correlation function for GPS signal acquisition and tracking is disclosed in the patent application Ser. No. 11/188,258, filed Jul. 25, 2005, entitled, Global Navigation Satellite System (GNSS) Receivers Based on Satellite Signal Channel Impulse Response, by the present inventor, which has been incorporated into this specification by reference. When the correlation is made between the phase-only version of the incoming signal and the phase-only version of the replica code, it acts as a symmetric phase-only matched filter (SPOMF). The use of a SPOMF and other nonlinear spectrum filtering techniques for GPS signal acquisition and tracking is disclosed in the co-pending patent application Ser. No. 11/188,258, entitled, Global Navigation Satellite System (GNSS) Receivers Based On Satellite Signal Channel Impulse Response, filed Jul. 25, 2005. Both impulse response and phase-only matching methods provide significant improvement in timing accuracy and multipath rejection over prior art receivers without use of any additional specialized hardware. A comparison of correlation, impulse response, and phase-only matching methods, together with computer simulation and empirical data, is disclosed in the paper entitled, "Generalized Frequency-Domain Correlator for Software GPS Receiver: Preliminary Test Results and Analysis," presented by the present inventor at the $19^{th}$ International Technical Meeting of the Institute of Navigation Satellite Division (ION GNSS 2006) in Fort Worth, Tex., September 2006, which is incorporated into this specification by reference.

Figure 7:
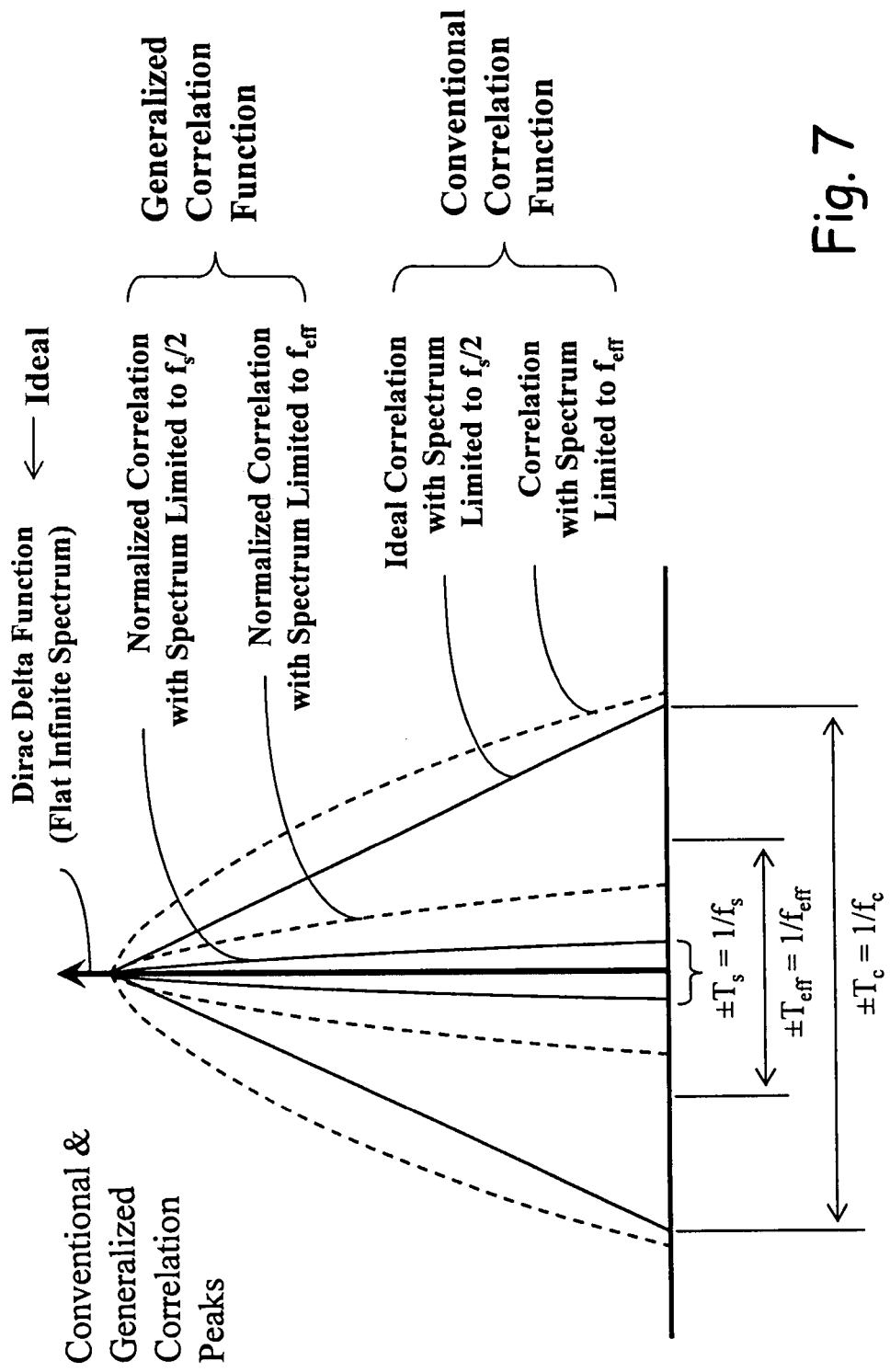
FIG. 7 is a drawing graphically illustrating the effects of signal/receiver bandwidth on generalized vs. conventional correlation schemes.

Referring to FIG. 7, a binary phase shift keying (BPSK) type of codes such as GPS C/A-code and P(Y)-code has its correlation function of a triangle shape with its base width being $\pm T_c$ where $T_c=1/f_c$ is the chip duration and $f_c$ is the chipping rate. The GFDC (e.g., a satellite signal channel impulse response or a symmetric phase-only matched filter) ideally produces a Dirac delta function. It thus has an infinite time resolution capability and is immune to multipath. In practice, however, both the signals and receivers are band-limited to the Nyquist rate (a half of the sampling rate $f_s$). The resulting peak is of the shape of a sin c function with its first nulls at $\pm T_s$, where $T_s=1/f_s$ is the sampling interval. Even so, the peak still has its base width much narrower than that of a correlation function because $T_s<T_c$. As such, it is less sensitive to multipath than conventional receivers. In addition, it can reveal the presence of close-in multipath signals that are otherwise difficult to discern as they are lumped into an enlarged peak for conventional correlations. In reality, however, the peak width $T_{eff}$ is determined by the effective bandwidth $f_{eff}$ of the signal and the transmitter-receiver link combined (i.e., $T_{eff}=1/f_{eff}$).

When a generalized correlation function is evaluated at discrete code lags, the peak location rarely falls onto a sampling point exactly. The true peak location is usually obtained through interpolation. Fitting a quadratic curve to the maximum correlation value and its two adjacent values yields the interpolated peak, which is similar in structure to the normalized early minus late correlation delay error discriminator popularly used in prior art receivers. Exemplary methods for peak interpolation are disclosed in the co-pending patent application, which has been incorporated by reference.

Figure 8:
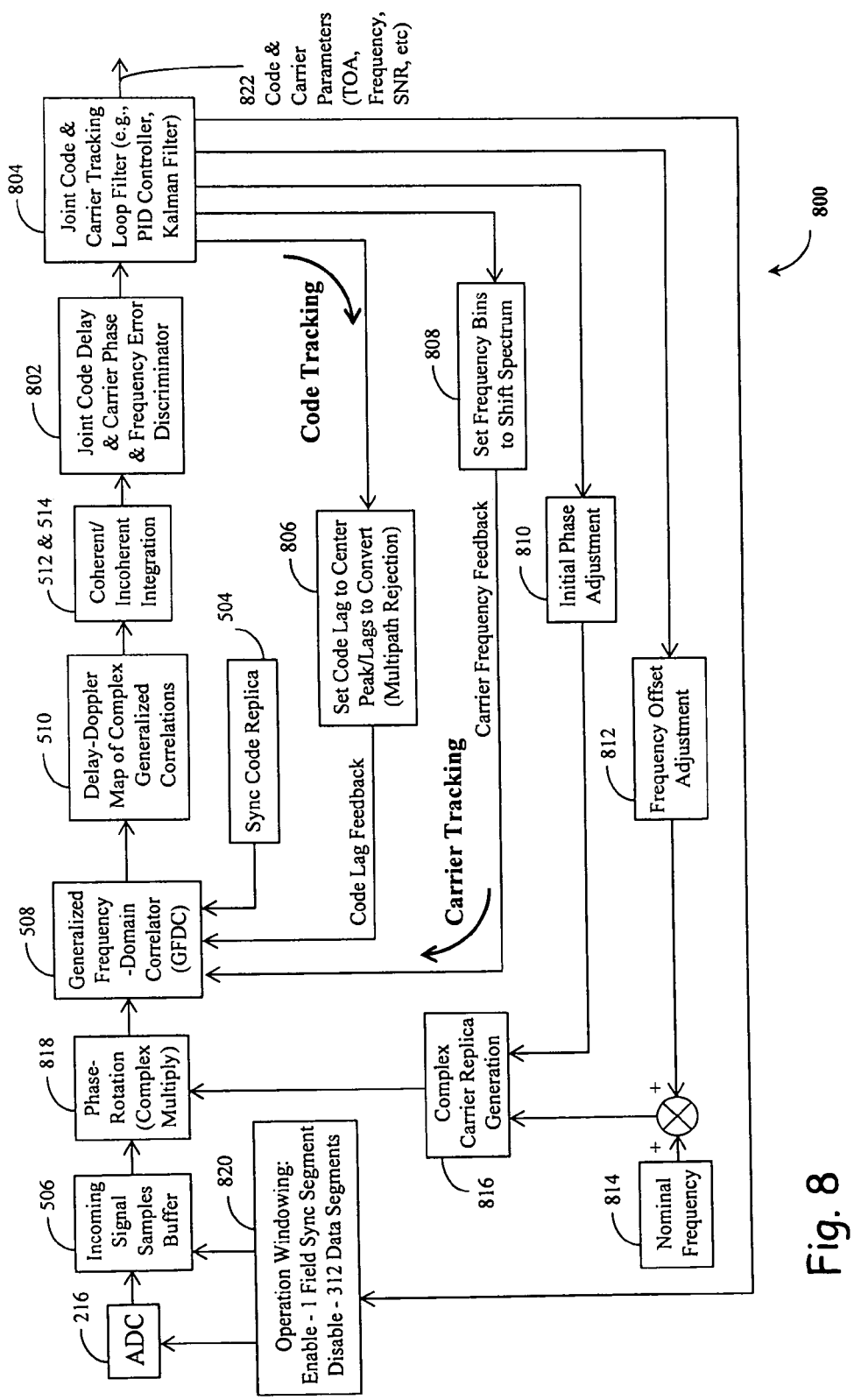
FIG. 8 is a schematic illustrating an exemplary embodiment of method steps to track a low duty factor code using a GFDC with coherent and incoherent integrations, a joint code delay and carrier and frequency error discriminator, and a joint code and carrier tracking loop filter in accordance with the present invention.

Referring to FIG. 8, an exemplary embodiment of a joint code and carrier tracking loop 800 is shown in accordance with the present invention. The tracking loop 800 is closed when a signal of interest is declared "detected" if the signal power exceeds a threshold which is pre-determined to maximize the probability of detection for a given rate of false alarms. In the tracking mode, the generalized correlation peak and its surrounding values are use to obtain the code delay and carrier phase and frequency estimates in a joint code delay and carrier phase and frequency error discriminator 802. The joint error discriminator 802 drives the joint code and carrier tracking loop filter 804, which provides code lag feedback 806 and carrier frequency feedback 808 to form the loop closure.

In conventional receivers, a delay-locked loop (DLL) makes use of a delay error discriminator for code tracking and a phase-locked loop (PLL) makes use of a phase error discriminator for carrier tracking. Sometimes, a frequency-locked loop (FLL) is used with a frequency error discriminator for carrier tracking instead. Although the code delay error discriminator and the carrier phase error discriminator can operate on complex correlations of the same data window, a conventional frequency error discriminator needs complex correlations over two consecutive data windows. These error discriminators are highly nonlinear and have a rather small linear operating region, beyond which the output starts to saturate and even becomes erroneous when the input is large. The conventional error discriminators perform a "point-tracking" when it is viewed in the signal parameter space of code delay vs. carrier frequency.

The delay-Doppler mapping of generalized complex correlations offers a "grid-tracking" mechanism in the present invention. Grid tracking is a technique disclosed in the U.S. Pat. No. 6,407,699, issued Jun. 18, 2002 to the present inventor, which has been incorporated by reference. Any signal wandering around within this grid can always be captured. The integrated complex correlation values at the grid points can be used to derive the code delay and carrier phase and carrier frequency errors at the same time, leading to the joint error discriminator 802. It can also serve as a measurement prediction error when a Kalman filter is used as the joint code and carrier tracking loop filter. In a sense, this implements a small-scale search constantly. An exemplary implementation and its simulation results are disclosed in the paper entitled "GPS Signal Tracking with Kalman Filter Based on Joint Code Delay and Carrier Phase and Frequency Error Discriminator," presented by the present inventor at the $60^{th}$ Annual Meeting of the Institute of Navigation in June 2004 in Dayton, Ohio, which is incorporated into this specification by reference.

In conventional receivers, the code and carrier tracking loops are typically designed separately and run "independently," although there may be some assistance (e.g., rate aiding) from the carrier loop to the code loop. In conventional designs, each tracking loop is represented by a small signal model, thus linear and time-invariant. Classical control theory is applied to select the most appropriate loop filter parameters such as loop order and bandwidth. Conventional loop filter designs use fixed-coefficients and the resulting performance is at best a compromise between the noise performance and the dynamic tracking capability.

Referring again to FIG. 8, the joint code delay and carrier phase and frequency error discriminator 802 and the joint code and carrier tracking loop filter 308 can be combined inside a joint nonlinear tracking loop filter in accordance with the present invention. This concept of joint code and carrier tracking has been tested with real GPS data. The details of the approach and empirical results are disclosed in the above-mentioned paper by the present inventor. In addition, the use of a multiple model estimator, with each model representing a different bandwidth, is disclosed in the same paper as an alternative way to adjust the tracking loop bandwidth adaptively.

Still referring to FIG. 8, the code and carrier parameters 822 are used to set a code lag feedback 806 and a carrier frequency feedback 808. The carrier tracking loop can also be closed using a phase rotation (complex multiply) 818 with a complex carrier replica generation 816. The latter is done by adding a frequency offset adjustment 812 and an initial phase adjustment 810 from the joint tracking filter to a nominal frequency 814.

Since sync code of a broadcast digital transmission (BDT) is of low duty cycle, it is only necessary to turn on the tracking loop when the sync code is present. Operation windowing 820 is therefore timed at a signal's time of arrival predicted by the tracking filter. For an ATSC DTV signal, the operation is enabled for each field sync segment and disabled for 312 data segments, a ratio of 1:312. This offers a significant saving in power consumption. Moreover, only a single tracking loop is needed to operate continuously while switching from one transmitter to another sequentially (time sharing), thus reducing the overall system complexity.

Figure 9:
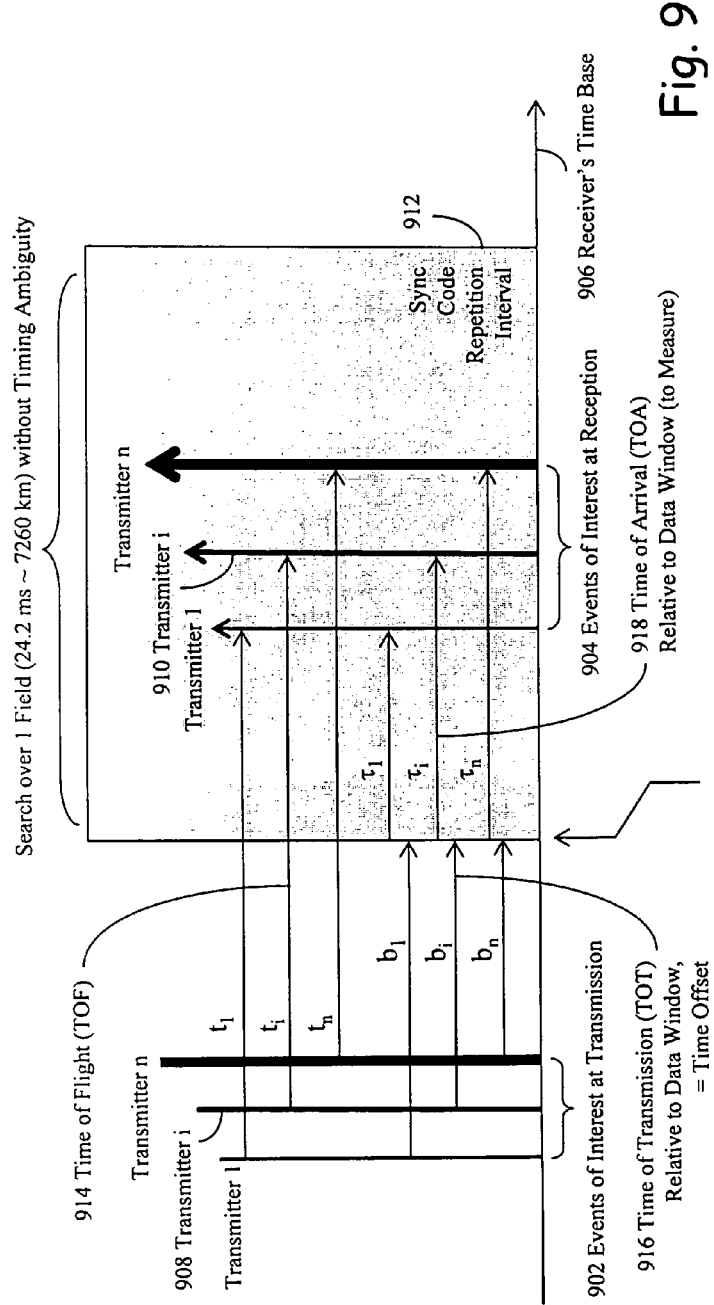
FIG. 9 is a drawing graphically illustrating the fundamental equation relating a measured time of arrival and a calibrated time offset with a total time of flight that links a known transmitter location to an unknown user location to determine.

Referring to FIG. 9, the fundamental equation 900 between events of interest at transmission 902 and events of interest at reception 904 is illustrated on a receiver's time base 906 in accordance with the present invention. In an embodiment, the leading edge of a field sync segment within an ATSC DTV frame can be such an event of interest. The timing relationship between the event of transmitter is at transmission 908 and the same event at reception 910 is characterized by a time of flight (TOF) $t_i$ 914, which can be decomposed into a time of arrival (TOA) relative to a data window $\tau_i$ 918 and a time of transmission (TOT) relative to the same data window $b_i$ 916 for i=1, 2, ..., n. Boundary of a data window 920 is typically marked by the leading edge of the first sample of the data window. Time of flight $t_i$ 914 is related to transmitter i's location ($x_i$, $y_i$, $z_i$), which is known, and a receiver's location ($\xi$, $\eta$, $\zeta$), which is to be estimated. Time of arrival $\tau_i$ 918 is measured relative to data window by a code and carrier tracking mechanism 800. Time of transmission relative to data window $b_i$ 916, which is also called time offset, is unknown that has to be estimated either before hand in a calibration procedure or at the same as the receiver's location in a joint estimation and calibration procedure. When a sync code is transmitted regularly and a data window repeats regularly, the time offset between the two remains constant. Change in distance between transmitter and receiver is reflected in variation of the time of arrival. However, both the transmitter's clock and receiver's clock are subject to drift (i.e., frequency instability). Although the receiver's clock error may be removed by using such a technique as measurement single difference, the transmitter's clock error may have significant variations over time, thus requiring constant time offset estimation or calibration. In one embodiment, calibration is done from time to time; and between calibrations, time offsets are considered piecewise constant. In another embodiment, each time offset is modeled as a second order polynomial fit wherein the fitting coefficients are estimated from data. In yet another embodiment, the time offsets are estimated together with the receiver location jointly. Referring back to FIG. 9, when search is conducted over a sync code repetition interval 912 such as one field within an ATSC DTV frame, the timing of a detected event is unique without any ambiguity. This is because a field within an ATSC DTV frame lasts about 24.2 ms, which corresponds a distance of 7,260 km whereas DTV signals are received from transmitters only few miles distant away.

Fundamental equation 900 is also called pseudo range equation when scaled by the speed of light c because of the presence of measurement error and noise term $w_i$. However, the pseudo range measured in accordance with the present invention differs from what is described in prior art techniques in two aspects. First, the present invention is based on measuring time of arrival relative to data window whereas prior art techniques aim at measuring pseudo range directly using time tags at transmission and reception. Second, time of arrival and other timing measurements are made on receiver's local time base (receiver clock) in the present invention whereas a reference time base (a reference clock) is employed in prior art techniques to which both transmitters' and receiver's time bases are referred. Except for cases wherein a transmitter's location and time of transmission are encoded on the radio signal according to the transmitter's clock, the use of a single local receiver clock as in the present invention is much simpler in concept and in practical implementation.

Slow-varying time offset 916, namely, a time of transmission (TOT) relative to a data window, is unknown to a receiver initially. It has to be estimated or calibrated before fundamental equation 900 can be used for position determination. Two calibration procedures are disclosed in the present invention that do not need external base stations, location servers, or monitor units as in prior art techniques but use support from commonly available auxiliary sensors and digital databases, hence termed "self calibrating". The two invention techniques are (1) point calibration and (2) displacement calibration, which are detailed below.

Figure 10:
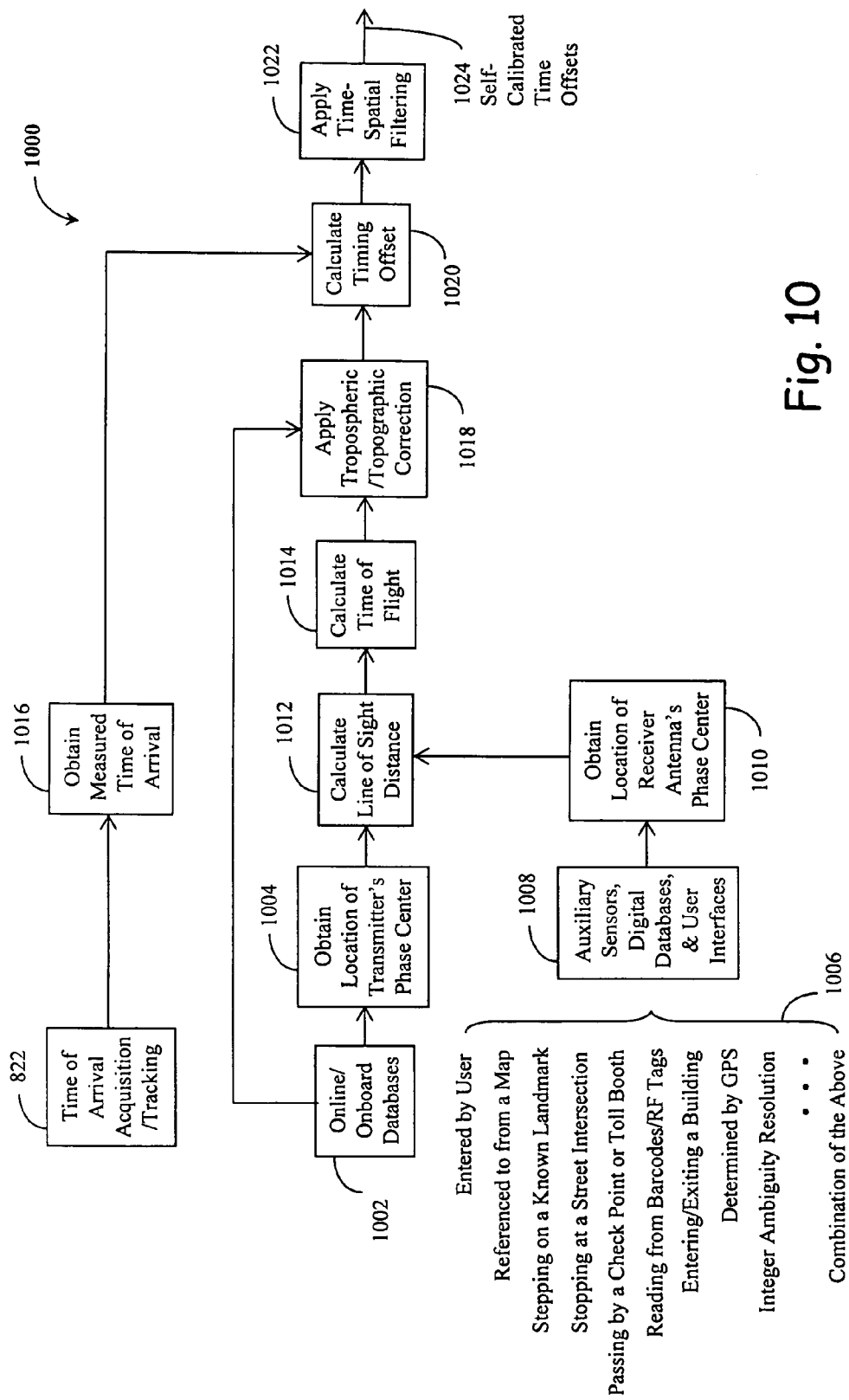
FIG. 10 is a schematic illustrating an exemplary embodiment of method steps for point calibration of time offset in accordance with the present invention.

Referring to FIG. 10, major method steps of an exemplary embodiment of a point calibration procedure 1000 is shown in accordance with the present invention. A first step is to obtain location of transmitter's phase center 1004 from online/onboard databases 1002. Next step is to obtain location of receiver antenna's phase center 1010 from auxiliary sensors, digital databases, and/or user interfaces 1008. Ideally it is the location of a receiver antenna's phase center that is needed for position location. However, in practice, the location of a physical center of an antenna may be used for operational simplicity at the cost of several millimeters (mm) up to centimeters (cm) errors introduced into measurements. The following are possible means included in, but not limited to, a list 1006 to provide a receiver location. The location is entered by a user from a keyboard, keypad, electronic pen pad, or touch screen among others. The location may also be referenced to from a digital map. A mobile unit may obtain its location by stepping on a known landmark, stopping at a street intersection, passing by a check point or toll booth, reading barcodes and RF tags, and entering to/exiting from a building. A receiver can also perform self-positioning based on integer cycle ambiguity resolution for multiple wavelength measurements with an initial range estimated from measured signal strength vs. nominal transmitter power. It may also be determined by such positioning devices as a GPS receiver when GPS signal is still available or from a combination of the above. When a GPS receiver is used in combination with a BDT receiver of the present invention, the GPS position fixes can be used to calibrate the BDT receiver on a continuous basis whenever GPS fixes of good quality are available. On the other hand, the calibrated BDT receiver can provide additional measurements, usually of good geometry, to augment the GPS measurements to obtain a joint calibration and position solution. When GPS signals are not available in urban canyon or in door, a BDT receiver can keep operating, standalone after calibration, thus maintaining the continuity of a user's position solution. As a whole, the self-calibrated position can be as good as what a GPS receiver can offer prior to its outage. The same is also true for a BDT receiver integrated with a dead-reckoning device such as an inertial measurement unit (IMU).

Still referring to FIG. 10, a next step is to calculate line of sight distance 1012 given a transmitter and a receiver. It follows to calculate time of flight 1014 by scaling the distance with the speed of light and to apply tropospheric/topographic correction 1018. A simultaneous step is to obtain measured time of arrival 1016 from a time of arrival acquisition/tracking mechanism 822. A next step is to calculate time offset 1020 given a time of flight from 1014 and a time of arrival from 1016. The final step is to apply time-spatial filtering 1022, leading to self-calibrated time offsets 1024 for subsequent use. The speed of a radio signal changes when propagating through the troposphere as a function of weather conditions, e.g., air temperature, atmospheric pressure, and humidity. The weather information in the vicinity of a BDT receiver can be obtained via online/onboard databases 1002 from the Internet or other sources such as National Oceanic and Atmospheric Administration (NOAA), from which the actual tropospheric propagation velocity can be determined using such techniques as those disclosed in "Chapter 17 Tropospheric Effects on GPS" by J. J. Spilker, Jr. in the book entitled, *Global Positioning System: Theory and Applications* (Vol. 1), edited by B. W. Parkinson and J. J. Spilker Jr., AIAA, 1996.

Radio geolocation with terrestrial transmitters is better suited for two-dimensional latitude/longitude position location because the vertical dimension (i.e., height above the ground) of transmitters is rather small compared to horizontal dimensions. In terrains with hills and valleys relative to transmitters' phase center, a user may not lie on the circle of constant range around a transmitter if the user has a different altitude even though its line of sight distance to the transmitter is the same as the circle radius. In this case, a terrain topographic map can be used in 1018 to compensate for the effect of user altitude on the surface of the earth (i.e., the geoid).

Figure 11:
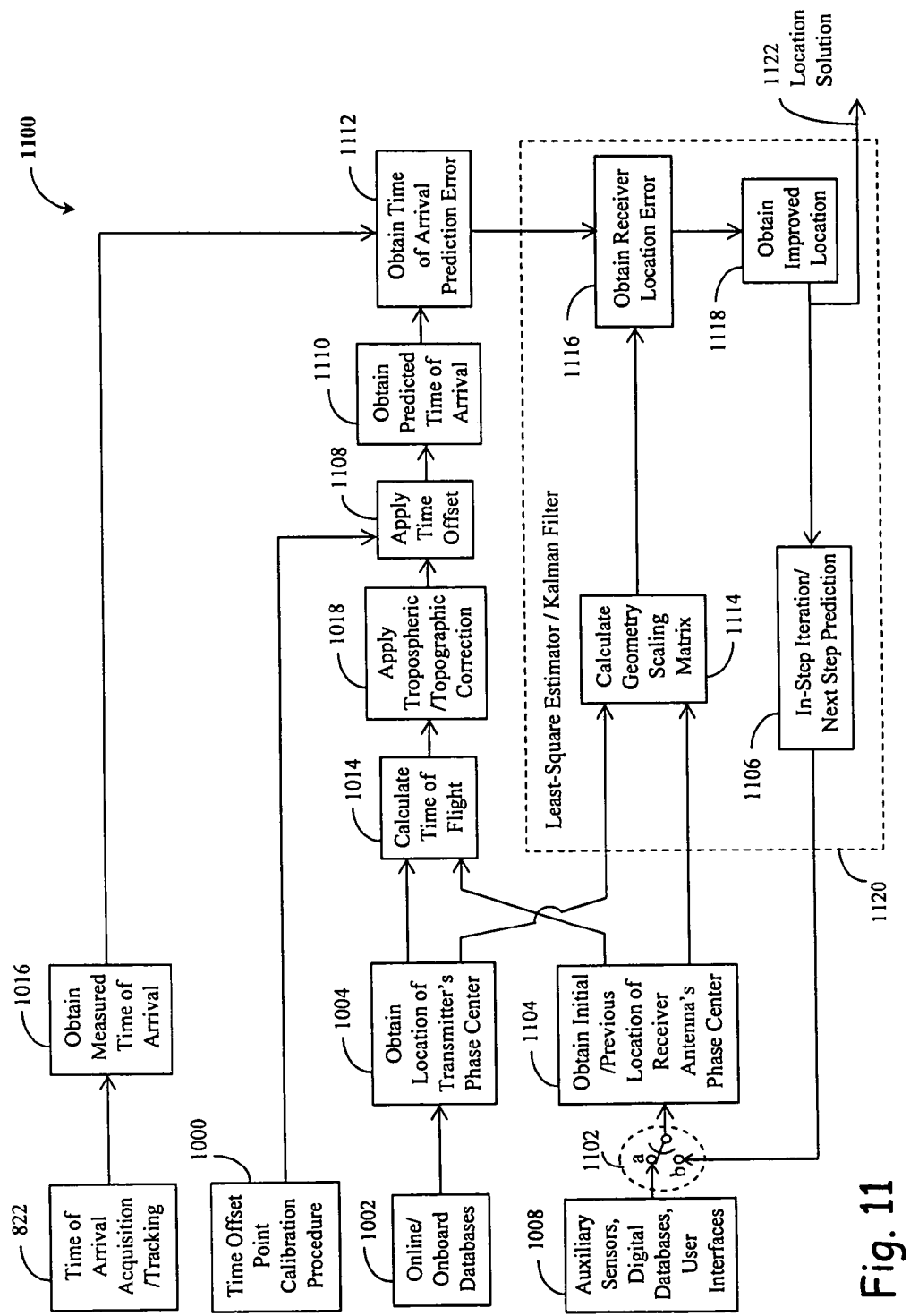
FIG. 11 is a schematic illustrating an exemplary embodiment of method steps to determine position location using measured times of arrival from a plurality of transmitters and point-calibrated time offsets thereof in accordance with the present invention.

Referring to FIG. 11, major method steps of an exemplary embodiment of a position location system 1100 using time offsets calibrated with an exemplary point calibration procedure 1000 is shown in accordance with the present invention. A first step is to obtain location of transmitter's phase center 1004 from online/onboard databases 1002. A next step is to obtain location of receiver antenna's phase center 1104 initially from auxiliary sensors, digital databases, and/or user interfaces 1008 (switch 1102 at position a) and subsequently from in-step iteration/next step prediction 1104 (switch 1102 at position b). It follows to calculate time of flight 1014 by scaling the line of sight distance between a transmitter and a receiver with the speed of light and to apply tropospheric/topographic correction 1018.

Still referring to FIG. 11, a next step is to apply time offset 1108, estimated from a time offset point calibration procedure 1000, to obtain predicted time of arrival 1110. A simultaneous step is to obtain measured time of arrival 1016 from a time of arrival acquisition/tracking mechanism 822. A next step is to obtain time of arrival prediction error 1120. The time of arrival prediction error for transmitter i can be written as $$\tau^i = \tau^i - \bar{\tau}^i \approx (\underline{h}^i)^T \Delta \underline{x} + w^i \quad (1)$$

where the superscript T stands for transpose; $\tau^i$ is the true time of arrival (as in the fundamental equation 900); $\bar{\tau}^i$ is the predicted time of arrival given by $$\bar{\tau}^i = \frac{\bar{r}^i}{c} - b^i \quad (2)$$

with $\bar{r}_i = \sqrt{(x^i - \bar{\xi})^2 + (y^i - \bar{\eta})^2 + (z^i - \bar{\zeta})^2}$ being the range between transmitter i at $(x^i, y^i, z^i)$ and the initial/previous receiver location at $\bar{X}^T = [\bar{\xi}\ \bar{\eta}\ \bar{\zeta}]$ and $b^i$ being the calibrated time offset; $w^i$ is the measurement error and noise term; $\underline{h}^i$ is the line of sight vector to transmitter i given by $$(\underline{h}^i)^T = \frac{1}{\bar{r}^i}[\bar{\xi} - x^i\ \bar{\eta} - y^i\ \bar{\zeta} - z^i] \quad (3)$$

and $\Delta \underline{x}$ is the receiver position error relative to the true receiver position $X^T = [\xi\ \eta\ \zeta]$ defined as $$\Delta \underline{x}^T = [\bar{\xi} - \xi\ \bar{\eta} - \eta\ \bar{\zeta} - \zeta] \quad (4)$$

For more than three transmitters, i.e., i=1, 2, ..., n≧3, a least-square solution of the receiver position error is obtained as $$\Delta \hat{\underline{x}} = (H^T H)^{-1} H^T \underline{\tau} \quad (5)$$

where the superscript −1 stands for matrix inversion, H is the geometry scaling matrix given by $$H^T = [\underline{h}^1\ \underline{h}^2\ \ldots\ \underline{h}^n] \quad (6)$$

and $\underline{\tau}$ is the collection of corresponding time of arrival prediction errors defined as $$\underline{\tau}^T = [\tau^1\ \tau^2\ \ldots\ \tau^n] \quad (7)$$

The improved position after this measurement update is given by $$\hat{\underline{x}} = \bar{X} + \Delta \hat{\underline{x}} \quad (8)$$

Referring back to FIG. 11, next steps are to calculate geometry scaling matrix 1114 according to Eqs. (3) and (6) and to obtain receiver location error 1116 according to Eq. (5). The final step is to obtain improved location 1118 according to Eq. (8). In addition to outputting, the location solution 1122 is fed back either for in-step iteration 1106 to account for approximation made in linearizing the time of arrival prediction in Eq. (1) or for next step prediction 1106 as an initial location. The whole process repeats. In an alternative embodiment, the operations described above, enclosed in the dashed line box 1120, can be replaced by a single Kalman filter.

Referring to FIG. 12a, a table lists the number of equations available per observation vs. number of observations (transmitters) vs. number of unknowns to solve over time. The first column shows the relationship at time 0 when the first observation is made at location $X_0$. There are four unknowns (three for position and one for time offset) in each fundamental equation 900. For n transmitters, there are only n equations but there are n+3 unknowns. It is therefore impossible to find a joint solution for the position and time offset.

The second column of the table in FIG. 12a shows the relationship when an additional observation is made at time 1 at a new location $X_1$. When the displacement vector $\Delta X_1$ from location $X_0$ at time 0 to location $X_1$ at time 1 is known from such an auxiliary sensor as an IMU, the position unknowns remain to be three. For n transmitters, there are 2n equations but there are still n+3 unknowns. As a result, it is now possible to find a joint solution of position and time offset when the number of transmitters is equal to or greater than three (n≧3). The last column of the table in FIG. 12a shows a general case wherein for n transmitters, the problem is solvable when the number of independent observations made at different locations k satisfies the following equation $$k \geq \left[\frac{n+3}{n}\right] \quad (9)$$

where [ ] stands for taking the integer part of the enclosed number.

Referring to FIG. 12b, the geometry for a sequence of vector displacements is sketched with all relevant variables shown. FIG. 12c is the corresponding timeline for the same displacement sequence.

Figure 13A:
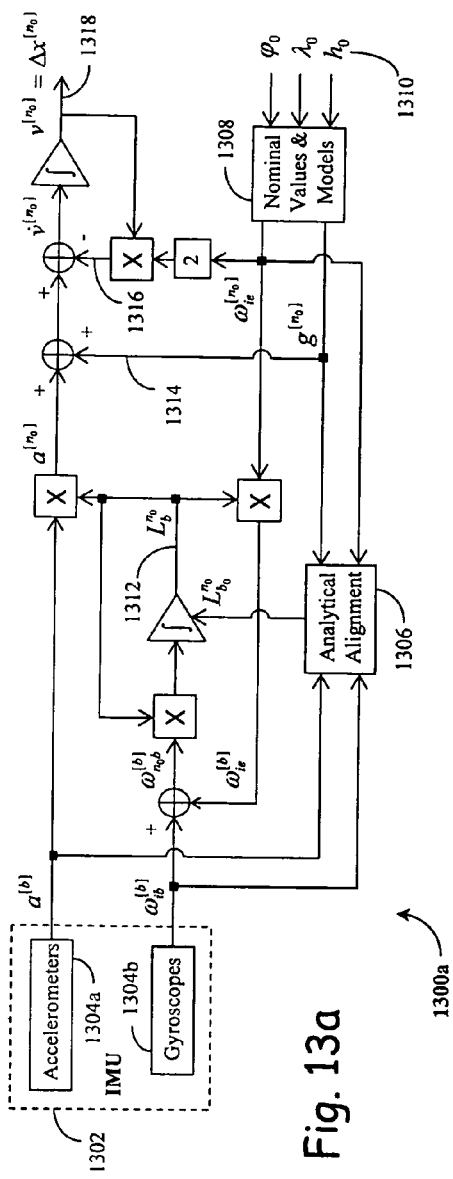
FIGS. 13a and 13b are schematics illustrating exemplary mechanisms to obtain displacement vectors using short-term stable inertial sensors (FIG. 13a) and using such auxiliary sensors as wheel speed sensors (WSS) and level/tilt sensors (LTS) as well as digital maps for ground vehicles (FIG. 13b)
Figure 13B:
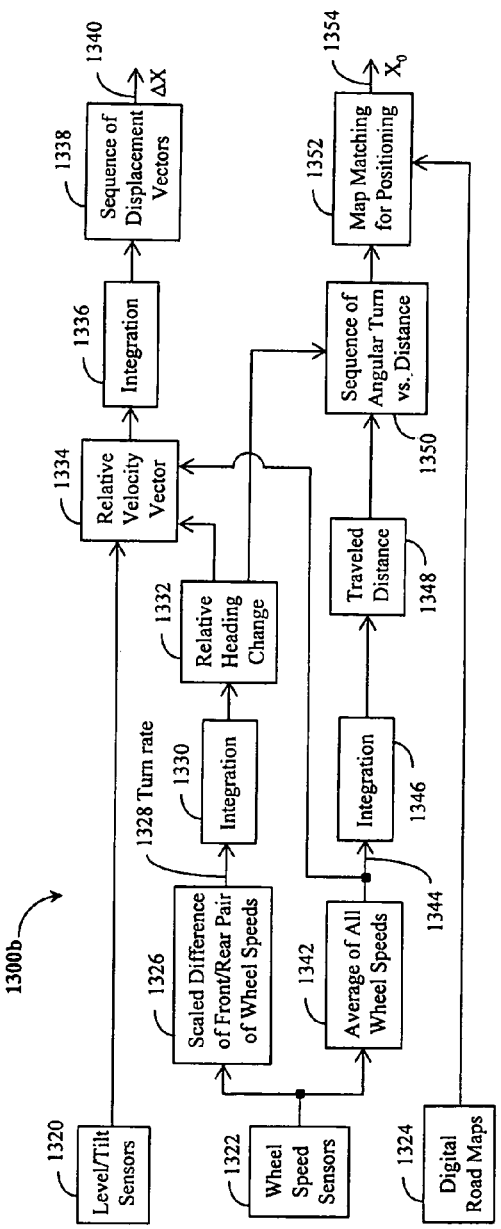

Two exemplary mechanisms to obtain displacement vectors from an approximately known initial position with auxiliary sensors are illustrated in FIG. 13a and FIG. 13b, respectively. A first exemplary mechanism 1300a shown in FIG. 13a is based on the short-term stability of inertial sensors, namely, accelerometers 1304a and gyroscopes 1304b, in a strapdown inertial measurement unit (IMU) 1302. From an initial condition 1310 consisting of latitude $\phi_0$, longitude $\lambda_0$, and altitude $h_0$, a local navigation frame (e.g., a level and north-pointing frame) is established at the initial position, referred to hereafter as $n_0$. By using nominal values and models 1308, the earth rotation vector $\omega_{ie}^{[n_0]}$ and the gravity vector $g^{[n_0]}$ can be expressed in this initial navigation frame. The attitude of the IMU 1302 relative to it can also be determined using an analytic alignment algorithm 1306, resulting in the initial direction cosine matrix $L_{b_0}^{n_0}$. Subsequent gyro output (incremental three-axis angular rotations) 1304b is processed to maintain the attitude of strapdown IMU 1302 relative to the initial navigation frame $L_b^{n_0}$ 1312. Simultaneously, accelerometer output (three-axis velocity increments) 1304a is rotated from the body frame to the initial navigation frame, compensated for the gravity 1314 and Coriolis effect 1316, and integrated into a velocity $v^{[n_0]}$ (i.e., vector displacement $\Delta x^{[n_0]}$) 1318. Compared to a conventional strapdown navigation solution, this exemplary mechanism develops its solution in a flat non-rotating frame (i.e., the initial navigation frame established at the initial position). Except for errors incurred to compensating for the gravity 1314 that is position-dependent, all other computations are exact. By consequence, vector displacement $\Delta x^{[n_0]}$ 1318 is expected to be of good quality for calibration when major inertial sensor errors are removed.

Referring to FIG. 13b, a second exemplary mechanism 1300b is illustrated that is best suited for ground vehicles. Auxiliary sensors include wheel speed sensors (WSS) 1322 that already exist as part of anti-lock break system (ABS) in most automobiles and level/tilt sensors 1320 as well as digital road maps 1324. For a four wheel vehicle, both the front and rear pairs of wheels experience speed difference when the vehicle makes a turn. Scaled difference of front/rear pair of wheel speeds 1326 provides an estimate of turn rate 1328. Integration 1330 of turn rate 1328 over time produces relative heading change 1332. In the meantime, average of all wheel speeds 1342 yields an average speed 1334 (similar to a tachometer). Together with level/title sensors 1320 and relative heading change 1332, relative velocity vector 1334 can be formed. Integration 1336 of relative velocity vector 1334 over time produces sequence of displacement vectors 1338 wherein $\Delta X$ 1340 is used for subsequent calibration.

Still referring to FIG. 13b, an additional usage of the second exemplary mechanism is illustrated for positioning purpose based on map matching. Integration 1346 of average speed 1334 generates traveled distance 1348 (similar to an odometer). It follows to form a sequence of angular turn vs. distance 1350, which can be considered as a numerical characterization of roads. Measured sequence 1350 can be compared with digital road map 1324 in map matching for positioning 1352, leading to an estimate of the initial position $X_0$ 1354, which can be used for a point calibration procedure 1000. Clearly, a sufficient distance may need to be traversed with significant turns in order to obtain a unique match of high confidence.

In one embodiment, displacement vectors may be estimated without any auxiliary sensors. When inside a multiple story building, the movement from room to room across different hallways and over several floors produces necessary displacements. With the building location, orientation, and floor plan known, it is sufficient for a displacement calibration procedure described below.

Figure 14:
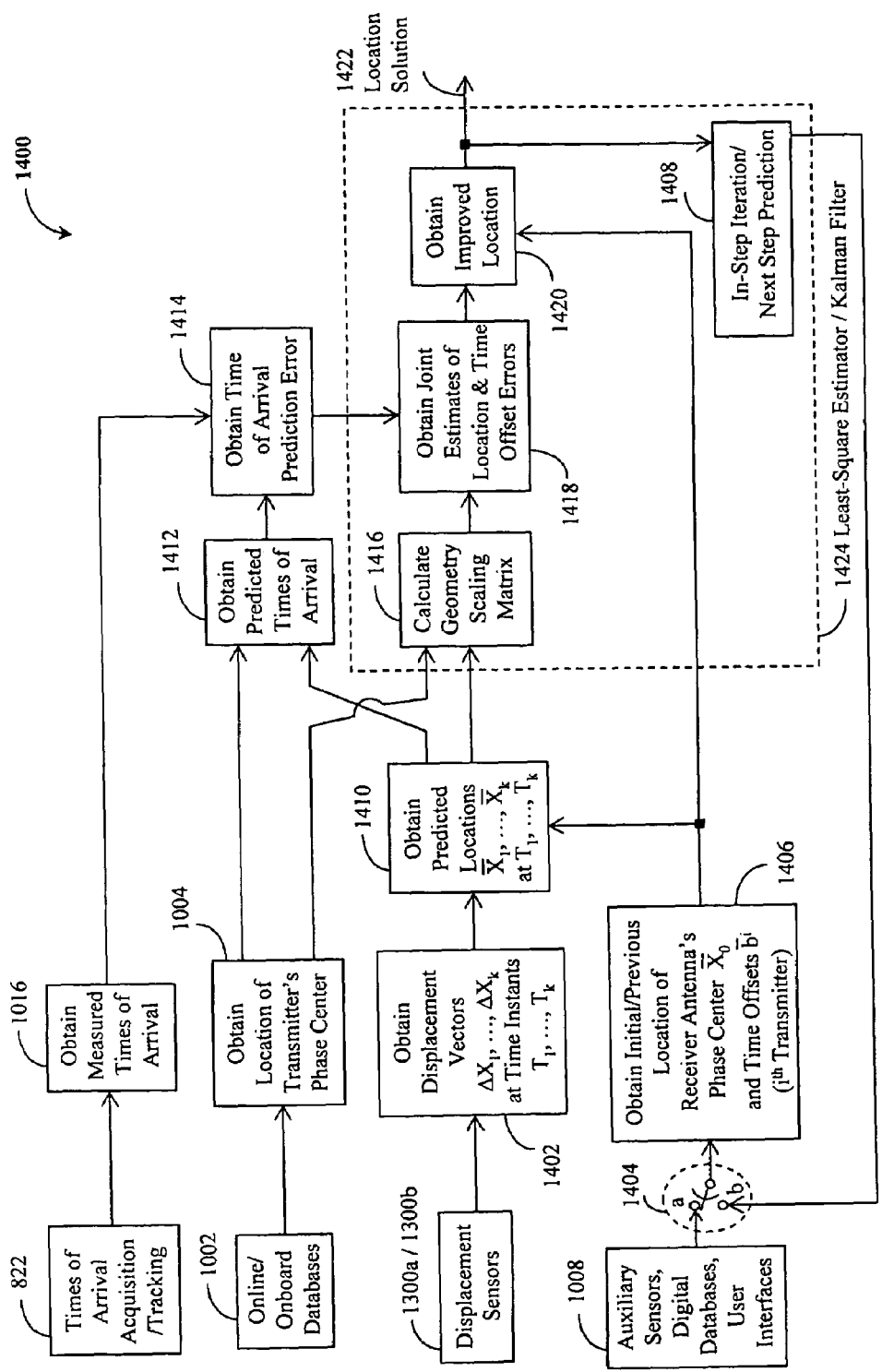
FIG. 14 is a schematic illustrating an exemplary embodiment of method steps to jointly determine position location and time offsets using measured times of arrival from a plurality of transmitters and a sequence of displacement vectors in accordance with the present invention.

Referring to FIG. 14, major method steps of an exemplary embodiment of a joint displacement calibration and position location procedure 1400 is shown in accordance with the present invention. A first step is to obtain displacement vectors $\Delta X_1, \ldots, \Delta X_k$ at time instants $T_1, \ldots, T_k$ 1402 from a displacement sensor such as 1300a, 1300b and a similar measurement mechanism afore-described. A next step is to obtain an initial/previous location of receiver antenna's phase center $X_0$ and transmitter i's time offset $\bar{b}^i$ (set to zero if not available) 1406, initially from auxiliary sensors, digital databases, and/or user interfaces 1008 (switch 1404 at position a) and subsequently from an in-step iteration/next step prediction 1408 (switch 1404 at position b). It follows to obtain the predicted locations $\bar{X}_1, \ldots, \bar{X}_k$ at time instants $T_1, \ldots, T_k$ 1410 using the initial position $\bar{X}_0$ 1406 and the displacement vectors $\Delta X_1, \ldots, \Delta X_k$ 1402. A next step is to obtain location of transmitter's phase center 1004 from online/onboard databases 1002. It follows to obtain predicted times of arrival 1412 with a location of transmitter's phase center 1004 and predicted locations 1410. A next step is to obtain measured time of arrival 1016 from a time of arrival acquisition/tracking mechanism 822. It follows to obtain time of arrival prediction error 1414. The time of arrival prediction error at time k for transmitter i is computed by $$\tau_k^i = \tau_k^i - \bar{\tau}_k^i (\underline{h}_k^i)^T \Delta \underline{x}_0 + w_k^i \quad (10)$$

where $\tau_k^i$ is the true time of arrival at time k for transmitter i; $\bar{\tau}_k^i$ is the predicted time of arrival 1408 given by $$\bar{\tau}_k^i = \frac{\bar{r}_k^i}{c} - \bar{b}^i \quad (11)$$

with $\bar{r}_k^i = \sqrt{(x^i - \bar{\xi}_k)^2 + (y^i - \bar{\eta}_k)^2 + (z^i - \bar{\zeta}_k)^2}$ being the range between transmitter i at $(x^i, y^i, z^i)$ and the predicted receiver location at time k $(\bar{X}_k)^T = [\bar{\xi}_k \ \bar{\eta}_k \ \bar{\zeta}_k]$ and $\bar{b}^i$ being the predicted time offset (set to zero if not known); $w_k^i$ is the measurement error and noise term; $\underline{h}_k^i$ is the line of sight vector to transmitter i given by $$(h_k^i)^T = \frac{1}{\bar{r}_k^i} [\bar{\xi}_k - x^i \ \bar{\eta}_k - y^i \ \bar{\zeta}_k - z^i \ -1] \quad (12)$$

and $\Delta x_0$ is given by $$(\Delta \underline{x}_0)^T = [\xi_0 - \overline{\xi}_0 \eta_0 - \overline{\eta}_0 \zeta_0 - \overline{\zeta}_0 b^i - \overline{b}^i] \qquad (13)$$

The predicted receiver location at time k can be related to the unknown initial position $(\overline{X}_0)^T = [\overline{\xi}_0 \ \overline{\zeta}_0 \ \overline{\zeta}_0]$ and the known displacement vectors $(\Delta X_k)^T = [\Delta \xi_k \ \Delta \eta_k \ \Delta \zeta_k]$ as:

$$\overline{\xi}_k = \overline{\xi}_0 + \sum_{j=1}^{K} \Delta \xi_j, \quad \overline{\eta}_k = \overline{\eta}_0 + \sum_{j=1}^{k} \Delta \mu_j, \ \overline{\zeta}_k = \overline{\zeta}_0 + \sum_{j=1}^{k} \Delta \zeta_j \qquad (14)$$

The corresponding geometry scaling matrix for all transmitters over the calibration interval is given by $$H^T = [H_1^T H_2^T \ldots H_k^T] \qquad (15)$$

where $H_k$ is the geometry scaling matrix at time k given by $$H_k^T = [\underline{h}_k^1 \underline{h}_k^2 \ldots \underline{h}_k^n] \qquad (16)$$

Compared to Eqs. (2), (3), and (4), the formulations in Eqs. (11), (12) and (13) have an additional term corresponding to the time offset to be estimated.

Still referring to FIG. 14, a next step is to calculate geometry scaling matrix 1416 according to Eqs. (12), (15) and (16). It follows to obtain joint estimates of receiver location and time offset errors 1418 according to Eq. (5). The final step is to obtain improved location 1420 according to Eq. (8). In addition to outputting, the location solution 1422 is fed back either for in-step iteration 1406 to account for approximation made in linearizing the time of arrival prediction as in Eq. (1) or for next step prediction 1406 as an initial location. The whole process repeats. In an alternative embodiment, the least square estimator enclosed in the dashed line box 1424 can be replaced by a Kalman filter.

Figure 15:
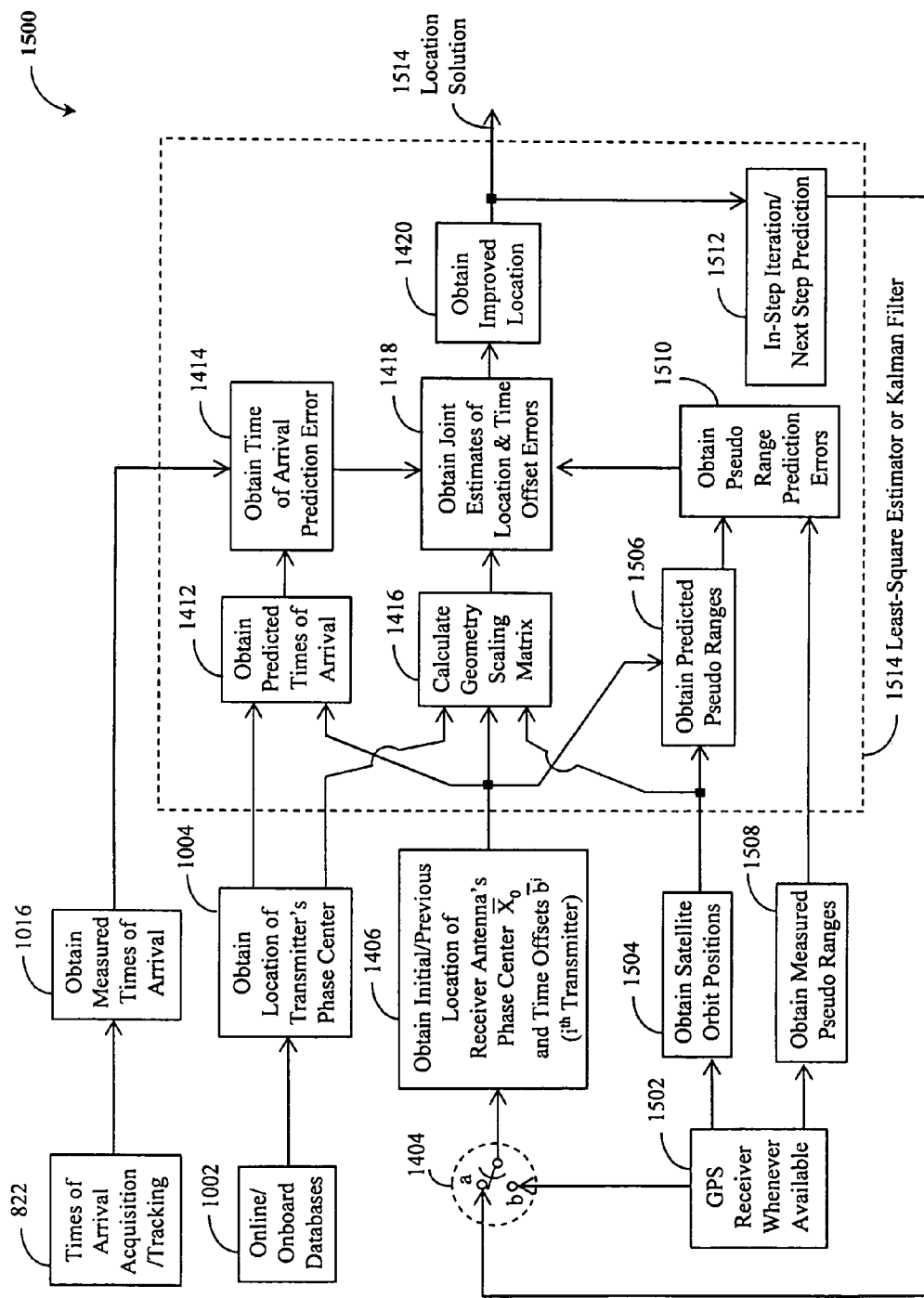
FIG. 15 is a schematic illustrating an exemplary embodiment of a BDT receiver integrated with a GPS receiver when GPS signal is available for joint position location and time offset calibration in accordance with the present invention.

Referring to FIG. 15, an exemplary embodiment 1500 of a BDT receiver integrated with a GPS receiver (when GPS signal is available) in a tightly coupled manner is illustrated for joint position location and calibration in accordance with the present invention. Compared to an alternative embodiment 1400 in FIG. 14, displacement sensors and associated processing blocks 1008, 1300a/1300b, 1402, and 1410 are now replaced by a GPS receiver in this embodiment 1500 in FIG. 15. A first step is to obtain predicted pseudo ranges 1506 based on GPS satellite orbit positions 1504 from a GPS receiver 1502 and predicted locations 1406. A simultaneous step is to obtain measured pseudo ranges 1508 from a GPS receiver 1502. It follows to obtain pseudo range prediction errors 1510 based on measured pseudo ranges 1508 and predicted pseudo ranges 1506. Line of sight vectors pertaining to GPS satellites are formed in much the same way as for BDT transmitters and added together to calculate geometry scaling matrix 1416. Pseudo range prediction errors 1510 are used together with time of arrival prediction errors 1414 to obtain joint estimates of position and time offset errors 1418, which are used in turn to correct previous estimates to obtain improved location 1420. Once again, the operations enclosed in the dashed line 1512 can be implemented with a Kalman filter in place of a least-square estimator. The exemplary scheme 1400 for joint position location and time offset calibration in FIG. 14 may be understood as a fixed-point smoother wherein all displacement vectors are brought back to the initial point and a batch processing is applied. In contrast, the alternative joint position location and calibration scheme 1500 is a filter that uses sequential processing.

Figure 16:
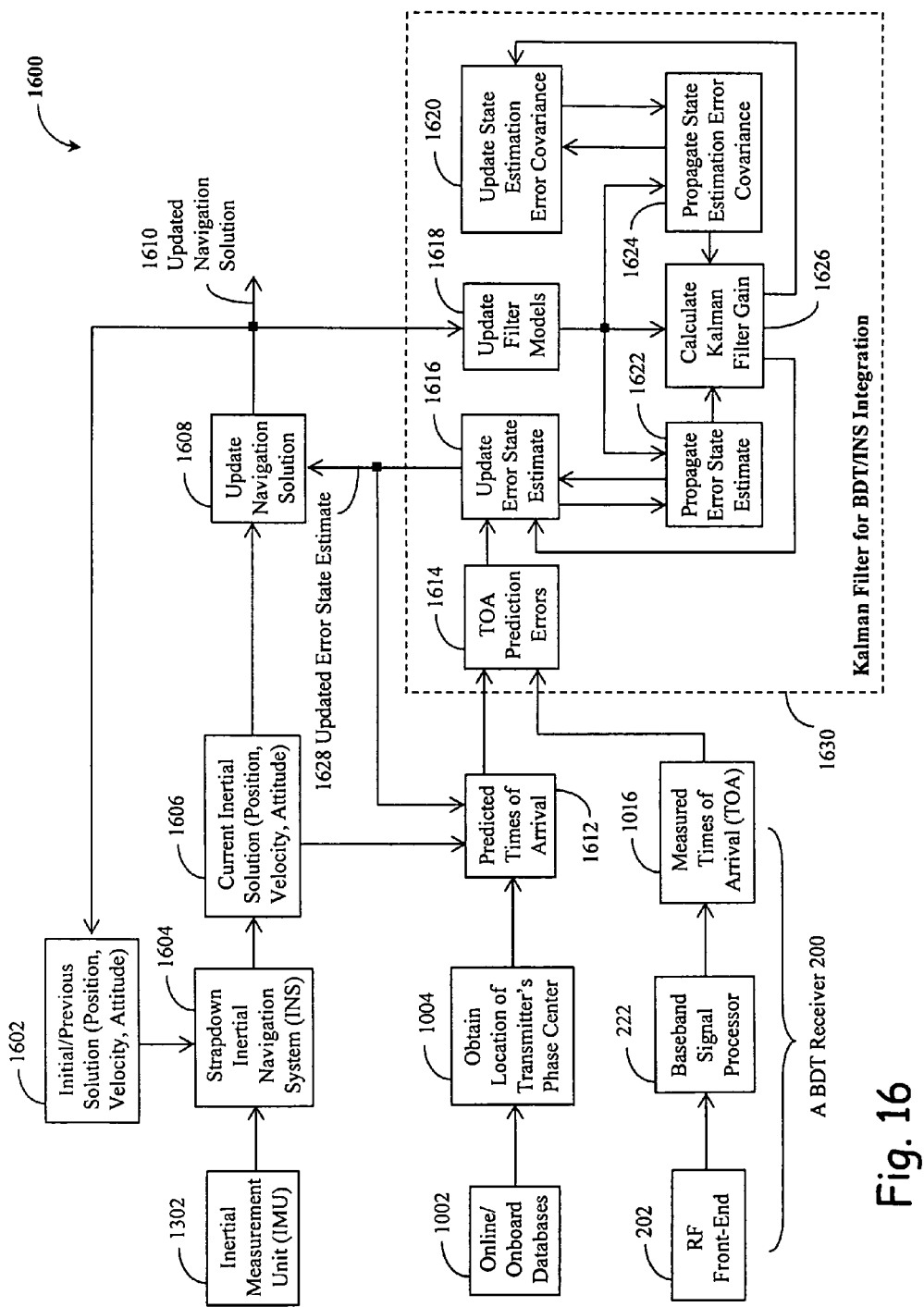
FIG. 16 is a schematic illustrating an exemplary embodiment of a BDT receiver integrated with an INS for joint position location and time offset calibration in accordance with the present invention.

Referring to FIG. 16, an exemplary embodiment 1600 of a BDT receiver integrated with a strapdown inertial navigation system (INS) 1604 is illustrated for joint position location and calibration in accordance with the present invention. Starting from an initial navigation solution (consisting of position, velocity, and attitude) 1602, the strapdown INS 1604 integrates the outputs (accelerations and angular rates) of an inertial measurement unit (IMU) 1302 to produce current navigation solution 1606, which is subject to ever-growing errors accumulated from the initial condition errors and inertial sensors' bias and draft errors if they are not adjusted promptly. A broadcast digital transmission (BDT) receiver 200 of the present invention is configured in the embodiment 1600 for this purpose.

Still referring to FIG. 16, predicted times of arrival 1612 of a plurality of transmitters are obtained from current navigation solution 1606 and location of transmitter's phase center 1004 obtained from online/onboard databases 1002. In the meantime, measured times of arrival 1016 are delivered by a baseband signal processor 222 coupled to a front-end 202. Time of arrival prediction errors 1614 are calculated from measured times of arrival 1016 and predicted times of arrival 1612 that are adjusted with time offset estimate as a part of the updated navigation solution 1628. Time of arrival prediction errors 1614 are then used to drive Kalman filter for BDT/INS integration 1630, yielding updated error state estimate 1628. In such an integration Kalman filter, the error of a state vector (including position, velocity, attitude, inertial sensors' bias, drift, scale factor, and misalignment, and transmitters' time offset and drift) relative to the true value is estimated. In a Kalman filter, time-propagation step is followed by measurement-update step and the cycle repeats. From an initial condition, a first step is to propagate error state estimate 1622 and to propagate estimation error covariance 1624 as well. It follows to calculate Kalman filter gain 1626. When a measurement (i.e., time of arrival prediction errors 1614) becomes available, it is used to update error state estimate 1616. Updated error state estimate 1628 is used to update navigation solution 1608 by removing various errors and the updated navigation solution 1610 is used in turn to drive the INS 1604 and to update filter models 1618 for next cycle. The techniques for design and construction of a least-square estimator or a Kalman filter that possesses the characteristics relevant to the present invention are well known to those of ordinary skill in the art.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one 4 output device. Each computer program can be implemented in a high-level procedural or object-oriented programming language or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files, such devices include magnetic disks, such as internal hard disks and removal disks, magnetic-optical disks, and optical disks. Storage devices suitable for tangibly embodying computer program instructions and data include all forms of non-volatile memory, including by way of example, semiconductor memory devices such as EPROM, EEPROM, and flash memory devices, magnetic disks such as internal hard disks and removable disks, magnetic-optical disks, and CD-ROM disks and rewritable disks. Any of the foregoing can be supplemented by, or incorporated in, ASICs.

Although the description above contains much specificities, these should not be construed as limiting the scope of the invention but as merely providing illustrations of some of the presently preferred embodiments of this invention. For example, the present invention provides a generic signal processing architecture of versatility where many processing steps can be tailored to achieve a desired combination of functionalities. Some time-domain and frequency-domain processing steps are complementary for one application but redundant for another. As a result, some steps may be made optional and others are omitted. Flexibility is also provided for design parameters tradeoff to best suit a particular application. As a preferred method, digital implementation of the frequency-domain approach to extracting phase information and performing phase-only correlation is described in the specification. However, conventional correlation implemented using time-domain matched filters, parallel correlators, and narrowly spaced correlators in electronics or in software or a combination thereof may be used to realize the same functionalities. Conventional or gated DLL, PLL, and/or FLL may be used to replace a preferred joint code and carrier tracking loop of the present invention. Similarly, a least-square estimator and a Kalman filter detailed in this specification may be substituted with such nonlinear filters as an unscented Kalman filter, a particle filter, and a variant thereof for the same purposes. A constant bias is modeled in the error state vector for time offset in the exemplary joint estimation formulation of this specification. It is possible to account for higher order effects by including such terms as a drift in the error state. Reference has been made mostly to digital television signals but the present invention is equally applicable to broadcast digital radio/audio signals and other broadcast digital transmissions in general.

It is understood that the various figures described above illustrated only the preferred embodiments of the present invention system and method. A person skilled in the art can therefore make numerous alterations and modifications to the described embodiments utilizing functionally equivalent components and method steps to those shown and described. All such modifications are intended to be included within the scope of the present invention as defined by the appended claims.

What is claimed is:

1. In a self-calibrating position location system utilizing a plurality of transmitters that broadcast digital multimedia signals, a method of obtaining a position solution for a user receiver, comprising the steps of:

receiving broadcast digital transmissions from at least some of said transmitters, wherein each of said broadcast digital transmissions embeds at least one known periodic code, and wherein each of said transmitters has a transmitter phase center;

providing a user receiver that generates a time base;

determining a measured time of arrival of said known periodic code at said user receiver relative to said time base of said user receiver;

estimating a phase center of said antenna of said user receiver, therein producing a receiver phase center;

calculating, at said user receiver, self-calibrating time offsets from said transmitter phase center and said receiver phase center calculating a predicted time of arrival of said known periodic code for said transmitters based on said self-calibrating time offsets; and determining a position of said user receiver based on said measured time of arrival and said predicted time of arrival of each of said transmitters.

2. The method according to claim 1, wherein said transmitters are selected from a group comprising, surface transmitters, airborne transmitters, and satellite transmitters.

3. The method according to claim 1, wherein each said broadcast digital transmission is a broadcast digital television signal and each said known periodic code is a combination of a synchronization code embedded in said broadcast digital transmission signal and a modulated pseudonoise sequence superimposed onto said broadcast digital television signal.

4. The method according to claim 3, wherein said broadcast digital transmission signal is an advanced television systems committee signal; and said synchronization code is a combination of a field synchronization segment and a segment synchronization code within an advanced television systems committee signal frame.

5. The method according to claim 1, wherein said step of receiving broadcast digital transmissions further includes the substeps of:

obtaining a center frequency from a channels selector for each of said transmitters;

turning a local oscillator to convert said broadcast digital transmissions from said center frequency to a predetermined intermediate frequency signal;

applying stages of mixing, bandpass filtering and amplification to said intermediate frequency signal; and digitizing said intermediate frequency signal, yielding incoming signal time samples.

6. The method according to claim 1, wherein said step of determining a measured time of arrival, further includes the substeps of:

maintaining lock onto said known periodic code of said transmitters;

determining a direct correlation peak pertaining to each of said transmitters;

interpolating for a refined location of said direct correlation peak, yielding said measured time of arrival.

7. The method according to claim 6, wherein said step of maintaining lock onto said known periodic code of said transmitters, further includes the substeps of:

generating an integrated delay-Doppler map of complex spectrum filtering correlations;

processing said integrated delay-Doppler map of complex spectrum filtering correlations through a joint code delay, carrier phase and frequency error discriminator, yielding a joint code delay, carrier phase and frequency error;

processing said joint code delay, carrier phase and frequency error through a joint code and carrier tracking filter, yielding a predicted code delay, carrier phase and frequency for a next data window; and sending said predicted code delay and carrier phase and frequency as code and carrier feedbacks to a spectrum filtering correlator, therein closing a code feedback loop and a carrier feedback loop.

8. The method according to claim 7, wherein said joint code and carrier tracking filter is a Kalman filter based on a coupled kinematic model of code delay, carrier phase and frequency.

9. The method according to claim 7, wherein said step of generating an integrated delay-Doppler map of complex spectrum filtering correlations, further includes the substeps of:
selecting a number of search intervals to be used as a decision block;
partitioning the number of search intervals into coherent integration intervals and incoherent integration intervals within each said decision block;
obtaining a coherently integrated delay-Doppler map of complex generalized correlations up to said coherent integration intervals; and
making an incoherent integration up to said incoherent integration intervals, yielding said integrated delay-Doppler map of complex spectrum filtering correlations.

10. The method according to claim 9, wherein said step of obtaining a coherently integrated delay-Doppler map of complex spectrum filtering correlations, further includes the substeps of:
obtaining incoming signal samples of several search intervals within said coherent integration interval;
applying an adjustment to said incoming signal samples, yielding frequency-adjusted samples;
summing up said frequency-adjusted samples per search interval on a sample-to-sample basis, therein yielding a pre-correlation coherent integration samples;
performing a spectrum filtering correlation between said pre-correlation coherent integration samples, therein yielding an coherently integrated generalized correlation as a function of delay; and
repeating said spectrum filtering correlation for a range of frequency feedback values, yielding said coherently integrated delay-Doppler map of complex spectrum filtering correlations.

11. The method according to claim 10, wherein said step of applying an adjustment to said incoming signal samples, further includes the substeps of:
obtaining an initial phase and a frequency offset estimate from a carrier frequency feedback;
generating a complex carrier replica with said initial phase and said frequency offset plus a nominal frequency; and
multiplying said complex carrier replica to incoming signal samples, yielding a phase-rotation adjustment to said incoming signal samples.

12. The method according to claim 10, wherein said step of obtaining incoming signal samples of several search intervals within said coherent integration interval, further includes the substep of windowing signal sampling and buffering operation in sync with a duty cycle of known periodic code within a repetition interval in a tracking mode.

13. The method according to claim 9, wherein said step of generating a coherently integrated delay-Doppler map of complex spectrum filtering correlations up to coherent integration interval, for a received signal subject to large frequency error, further includes the substeps of:
generating a delay-Doppler map of complex spectrum filtering correlations for each code repetition interval within said coherent integration interval;
padding zeros before and behind each delay-Doppler map point so as to maintain a uniform timely order relative other repetition intervals within said coherent integration interval, therein producing a zero-padded delay-Doppler map;
taking a fast Fourier transform of said zero-padded delay-Doppler map; and
adding a fast Fourier transform of a repetition interval to a partial sum of an earlier repetition interval, therein yielding said coherently integrated delay-Doppler map.

14. The method according to claim 13, wherein said step of generating a delay-Doppler map of complex spectrum filtering correlations, further includes the substeps of:
filling an incoming signal time samples buffer of double code length, wherein said samples buffer includes a half buffer of oldest samples and a half buffer of newest samples;
shifting out said half buffer of oldest when subsequent samples are shifted in;
preparing a replica code time samples buffer wherein a known periodic code is appended with zeros of the same amount, yielding a zero-padded replica code sequence of double code length; and
applying spectrum filtering correlation between samples in said incoming signal time samples buffer and said replica code time samples buffer, yielding said delay-Doppler map of complex spectrum filtering correlations.

15. The method according to claim 14, wherein said step of filling an incoming signal time samples buffer of double code length, further includes the substep of windowing signal sampling and buffering operation in sync with a duty cycle of known periodic code within a repetition interval in a tracking mode.

16. The method according to claim 14, wherein said spectrum filtering correlation is a generalized frequency-domain correlation, wherein frequency feedback is used to remove residual frequency error by spectrum shifting and code feedback is used to select correlations around main lobe and to place a sample on peak.

17. The method according to claim 6, wherein said step of determining a direct correlation peak, further includes the substeps of:
obtaining an integrated delay-Doppler map of complex spectrum filtering correlations for each of said transmitters; and
detecting a first peak in said integrated delay-Doppler map that exceeds a pre-defined threshold, therein yielding said direct correlation peak.

18. The method according to claim 1, wherein said step of calculating a predicted time of arrival of said known periodic code, further includes the substeps of:
calculating a line of sight distance between said location of each of said transmitters and said approximate location of said user receiver;
dividing an adjusted line of sight distance by a tropospheric propagation velocity of light, yielding an approximate time of flight from each of said transmitters to said user receiver; and
applying said self-calibrating time offsets for each of said transmitters to said approximate time of flight, yielding said predicted time of arrival of each of said transmitters.

19. The method according to claim 18, wherein said step of calculating a line of sight distance between said location of each of said transmitters and said approximate location of said user receiver, further includes the substeps of:
obtaining said location of each of said transmitters from at least one digital database; and
obtaining said approximate location of said user receiver in a general geographic area through a combination of an input from a user, a supply from at least an auxiliary sensor, a digital database, an estimate from measured signal strength plus propagation loss versus transmitter power, and a previous position location.

20. The method according to claim 18, wherein said step of dividing an adjusted line of sight distance by a tropospheric propagation velocity of light, further includes the substeps of:
   adjusting said line of sight distance for topographic distortion caused by terrain elevation in a vicinity of said user receiver when a two-dimensional position solution is sought, yielding an adjusted line of sight distance; and
   obtaining a tropospheric propagation velocity of light according to weather conditions in a vicinity of said user receiver.

21. The method according to claim 18, wherein said step of applying said self-calibrating time offsets for each of said transmitters, in a point calibration procedure, further includes the substep of:
   obtaining a measured time of arrival for each of said transmitters relative to said user receiver time base;
   obtaining a time of flight from each of said transmitters to said user receiver;
   subtracting said time of arrival from said time of flight, yielding a time of transmission relative to said time base; and
   averaging said time of transmission relative to said time base at least at one time and at least at one location, yielding said self-calibration time offsets for each of said transmitters.

22. The method according to claim 21, wherein said step of obtaining a time of flight from each of said transmitters to said user receiver, further includes the substeps of:
   obtaining a location of each of said transmitters from at least one digital database;
   obtaining a precise location of said user receiver in a general geographic area from a list of location input choices;
   calculating a line of sight distance between said location of each of said transmitters and said location of said user receiver;
   adjusting said line of sight distance for topographic distortion caused by terrain elevation in a vicinity of said user receiver when a two-dimensional position solution is sought, therein yielding an adjusted line of sight distance; and
   dividing said adjusted line of sight distance by a tropospheric propagation velocity of light, yielding said time of flight from each of said transmitters to user receiver.

23. The method according to claim 22, wherein said list of location input choices is selected from a group consisting of at least location input from a user, location referenced to from a digital map, location on a known landmark, location at a street intersection, location at a check point, location at an entrance/exit of a building, location read from barcodes and RF tags, location from a GPS receiver, location from a dead-reckoning device, self-positioning via integer ambiguity resolution for multi-wavelength measurements, and a combination of the above and alike.

24. The method according to claim 1, wherein said step of determining a position of said user receiver, further includes the substeps of:
   subtracting said predicted time of arrival from said measured time of arrival, yielding a time of arrival prediction error for each of said transmitters, wherein said time of arrival prediction error is arranged into a vector of time of arrival prediction errors for ensemble of said transmitters;
   obtaining a line of sight vector from said user receiver to each of said transmitters, wherein said line of sight vector is arranged into a geometry scaling matrix of line of sight vectors for ensemble of said transmitters;
   applying a least-square estimator based on said vector of time of arrival prediction errors and said geometry scaling matrix of line of sight vectors, yielding an estimate of location error of said user receiver; and
   adding said estimate of location error to said approximate location, yielding said position of said user receiver.

25. The method according to claim 1, wherein said step of determining a position of said user receiver, further includes the substeps of:
   subtracting said predicted time of arrival from said measured time of arrival, yielding a time of arrival prediction error for each of said transmitters at each of said calibration points, wherein said time of arrival prediction error is arranged into a vector of time of arrival prediction errors;
   obtaining an augmented line of sight vector from said user receiver to each of said transmitters at each of said calibration points, wherein said augmented line of sight vector is arranged into a geometry scaling matrix of augmented line of sight vectors;
   applying a least-square estimator based on said vector of time of arrival prediction errors and said geometry scaling matrix of line of sight vectors, yielding an estimate of location error of said user receiver; and
   adding said estimate of location error to said approximate location, yielding said position of said user receiver.

26. The method according to claim 25, wherein said step of obtaining a predicted time of arrival for calibration points, further includes the substeps of:
   determining a minimal number of calibration points for said displacement calibration procedure based on a number of transmitters available;
   obtaining a displacement vector to each of said calibration points within said displacement calibration procedure from a list of input choices;
   adding to said approximate location said displacement vectors successively, yielding an approximate location at each of said calibration points; and
   obtaining a predicted time of arrival for each of calibration points based on said approximate location at each of said calibration points and a location of each of said transmitters.

27. The method according to claim 26, wherein said list of input choices is selected from a group consisting of at least an inertial measurement unit mechanized relative to said approximate user location, an automotive dead reckoning system, and an indoor dead reckoning system.

28. The method according to claim 25, wherein said step of obtaining an augmented line of sight vector from said user receiver to each of said transmitters at each of said calibration points, further includes the substeps of:
   obtaining a line of sight vector from said user receiver to each of said transmitters at each of said calibration points; and
   increasing the dimension of said line of sight vector by one wherein an unit entry is inserted for each of said transmitters, yielding said augmented line of sight vector.

29. The method according to claim 1, wherein said step of determining a position of said user receiver, further includes the substeps of:
   obtaining a predicted time of arrival based on a predicted position of said user receiver from an auxiliary sensor, an initial estimate of time offset of each of said transmitters, and a location of each of said transmitters;

subtracting said predicted time of arrival from said measured time of arrival, yielding a time of arrival prediction error, wherein said time of arrival prediction error is arranged into a vector of time of arrival prediction errors for ensemble of said transmitters;

updating an error state estimate of an integration Kalman filter with said vector of time of arrival prediction errors, yielding an updated error state estimate, wherein said error state includes at least position errors, time offset errors, and auxiliary sensor parameter errors; and adding said updated error state estimate to said predicted position, yielding said position of said user receiver.

30. The method according to claim 29, wherein said auxiliary sensor is a combination of an inertial navigation system, an automotive dead reckoning system, an indoor dead reckoning system, and a GPS receiver when GPS signal is available.

\* \* \* \* \*